United States Patent
Asami

(10) Patent No.: US 6,925,284 B2
(45) Date of Patent: Aug. 2, 2005

(54) METHOD AND APPARATUS FOR EFFICIENT TRANSMITTING AND RECEIVING OF INFORMATION VIA INFORMATION UPDATING

(75) Inventor: Kazuo Asami, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 811 days.

(21) Appl. No.: 09/805,109

(22) Filed: Mar. 14, 2001

(65) Prior Publication Data

US 2003/0124974 A1 Jul. 3, 2003

(30) Foreign Application Priority Data

Mar. 17, 2000 (JP) ....................................... 2000-081723

(51) Int. Cl.[7] .................................................. H04B 1/69
(52) U.S. Cl. ................. 455/3.02; 455/414.3; 455/179.1
(58) Field of Search ............................ 455/3.02, 452.2, 455/414.1, 414.2, 414.3, 414.4, 179.1, 180.1, 180.2, 188.1, 188.2, 45; 340/7.48

(56) References Cited

U.S. PATENT DOCUMENTS

| | | | | |
|---|---|---|---|---|
| 6,041,124 A | * | 3/2000 | Sugita | 380/270 |
| 6,108,533 A | * | 8/2000 | Brohoff | 455/414.3 |
| 6,246,958 B1 | * | 6/2001 | Hirono | 701/208 |
| 6,668,158 B1 | * | 12/2003 | Tsutsui et al. | 455/12.1 |

FOREIGN PATENT DOCUMENTS

JP  11-34996  2/1999

OTHER PUBLICATIONS

"Digital Broadcasting", Wave Summit Lectures, p. 274.
"Information Distribution Service Using Communication Satellite—HK Channel", Hitachi Hyoron, vol. 80, No. 10, pp. 47–50.

* cited by examiner

Primary Examiner—Nick Corsaro
(74) Attorney, Agent, or Firm—Mattingly, Stanger & Malur, P.C.

(57) ABSTRACT

Information transmitted through wireless communications formed by information transmission lines from artificial satellites and radio towers or through wired communications established by cables is categorized into four categories. The individual information is transmitted in a broadcasting mode in synchronization with the information transmission timing defined for each individual information category. The information receiver captures and edits the received information and provides output for the service client in the manner associated with the individual category corresponding to the received information. Category-4 information is transmitted with the highest priority immediately when the information is generated; Category-3 information is transmitted periodically, for example, every five minutes; Category-2 information is transmitted at a time slot when the transmission line is relatively unoccupied; and Category-1 information is transmitted at a time slot when the transmission line is least occupied.

14 Claims, 11 Drawing Sheets

METHOD AND APPARATUS FOR EFFICIENT TRANSMITTING AND RECEIVING OF INFORMATION VIA INFORMATION UPDATING

BACKGROUND OF THE INVENTION

The present invention relates to an information transmission and receive method and its apparatus, and an information acquisition method and its apparatus suitable for receiving the broadcasting and communication data from artificial satellites and/or radio towers, more specifically, to a method for transmitting an information to mobile stations such as automobiles and its apparatus.

In the conventional broadcasting method (radio and television) using analog radio waves, the information transmitted from the broadcasting station is almost concurrently received at the receiver and provided for output in the form of voice and/or video images. Though supplemental signals used exclusively for broadcasting operations and other information are added on the base signals, the information being transmitted is merely provided for output at the receiver basically almost simultaneously, and thus, the relation between the operation for transmission and receive and the operation for output on the time domain can be stated as real time.

The advance of the latest digital technologies makes a broadcasting method based on digital signals more dominant in this field instead of the conventional broadcasting method using analog signals. Recent topics in broadcasting technologies are described in detail in "Digital Broadcasting", Wave Summit Lectures published by OHM Publishing Co. Japan, in which a digital broadcasting method is still characterized as real-time relationship between the transmission and receive operation and the output operation. A future prospect in the new "broadcasting" technologies is described briefly on the page 274 in this book, in which the authors asserts that "Internet Broadcasting" technologies by using Internet will be expected to be developed in the future.

A receiver terminal having a function for storing data is described in the article "Information Distribution Service using Communication Satellite-HK CHANNEL-, Hitachi Hyoron, Vol. 80, No. 10, pp. 47–50 (1988, 10),which implies one of prospective forms of broadcasting in the future.

A relatively wide frequency band for radio waves is required in the conventional analog-based broadcasting and communication method, which imposes a limit for maximum utilization of such a limited resource as radio waves.

Today, several projects on digitization of broadcasting and communication systems is in progress in order to solve this problem. By means of digitization in broadcasting and communication systems, several times larger amount of information can be transmitted concurrently with the conventional range of frequency band in comparison with the analog-based method. In fact, one channel for the analog-based broadcasting systems can be expanded up to several channels in the digital broadcasting systems.

In order to cope with the new age in progress toward the advanced information-intensive society, it is strongly expected to make more effective use of the information transmission lines as limited resources as described above in such a circumstance that the information becomes more diversified and its volume becomes extremely large. In addition, it is also strongly expected that they can transmit and report promptly the information having the highest importance and exigency among all the diversified information.

In recent years, several methods for communication and broadcasting method using artificial satellites are proposed, for example, found in Japanese Patent Application Laid-Open No. 11-34996 (1999).

The present invention is aimed for coping with digitization of broadcasting and communication systems, and especially, along with the remarks on the fact that there is a large difference between the information transmission time and the information output time, and that the exigency and importance of the information depends on the property of the information, an object of the present invention is to provide an information transmission method and an information output method both making effective use of the limited broadcasting and communication channels with an increase in the digital information transmission rate and information compression technologies.

In the information transmission and receive method of the present invention, the information transmitted through wireless communications established by the information transmission line using artificial satellites and radio towers or wired communications established by electric cables and/or optical fibers is categorized; the individual information is transmitted in a broadcasting mode in synchronized with the information transmission timing defined for the individual information category; and the information receiver captures and edits the received information and provides output for the service client in the manner associated with the individual category corresponding to the received information.

DETAILED DESCRIPTION OF THE PREFERRED EMBODIMENTS

Figure 1:
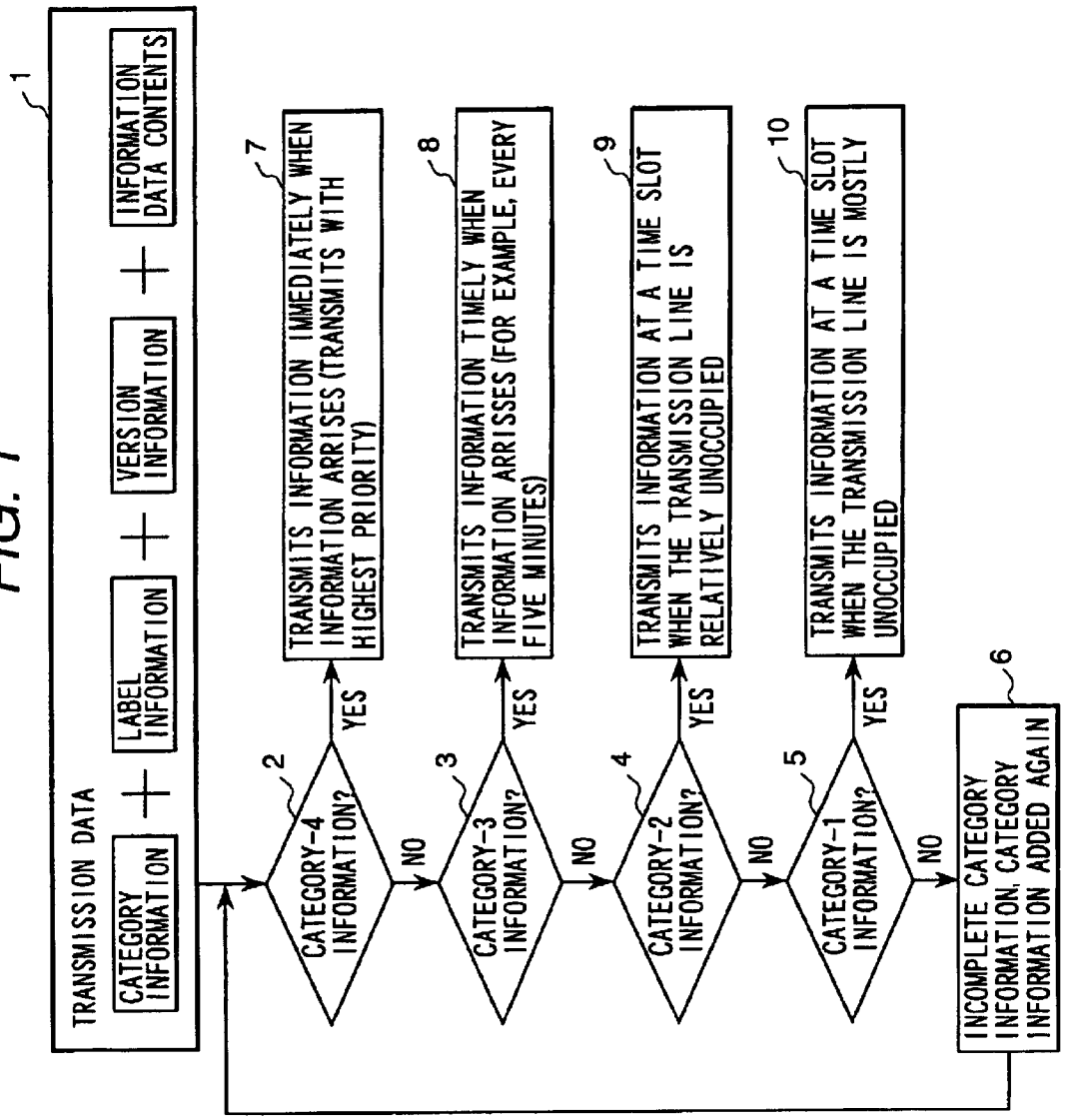
FIG. 1 is a flowchart describing the information transmission and receive method relevant to one embodiment of the present invention.
Figure 2:
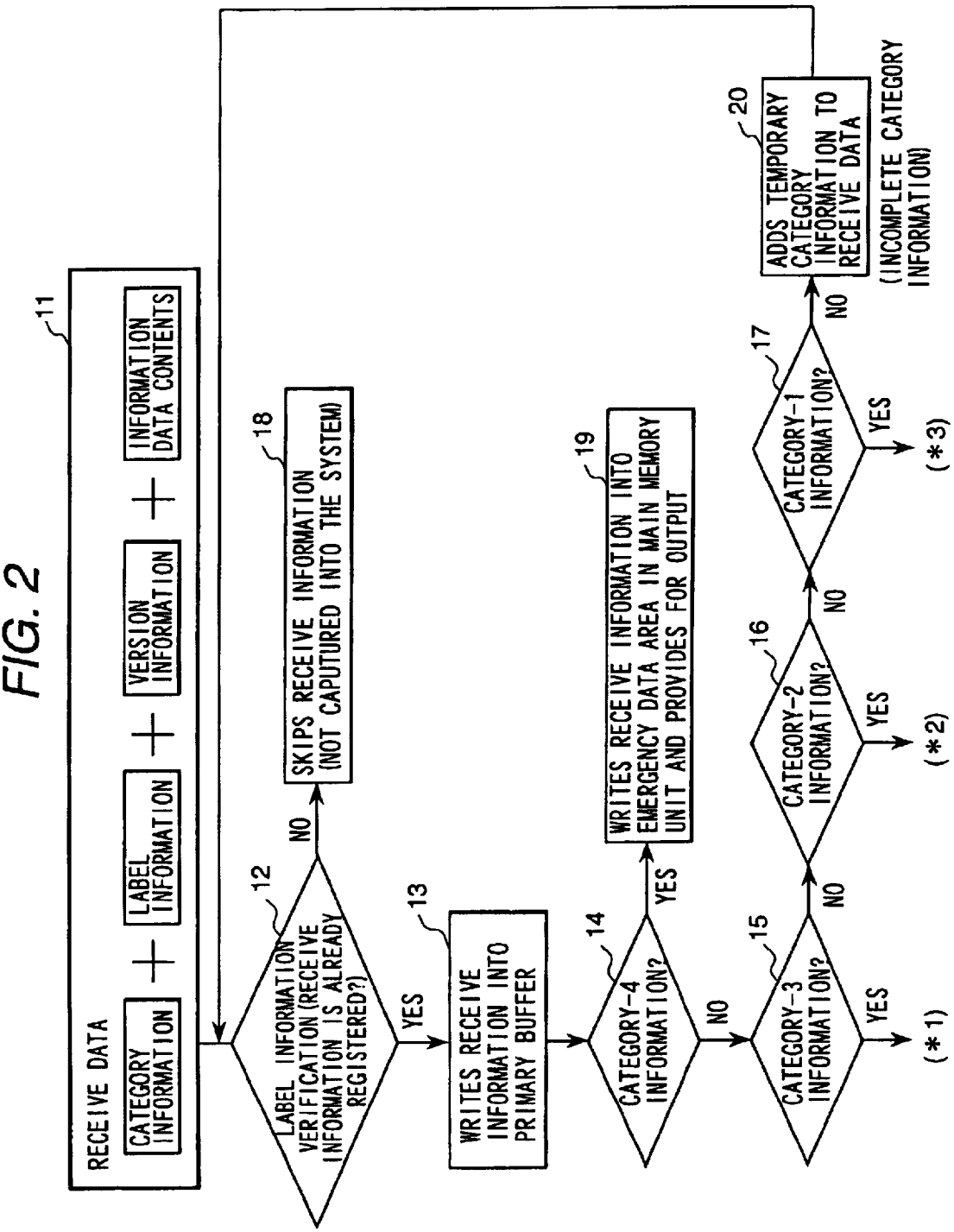
FIG. 2 is a flowchart describing the information transmission and receive method relevant to one embodiment of the present invention.

At first, the outline of the embodiments of the present invention is described below.

(Information Transmission Method)

One embodiment of the information transmission method in the present invention has such a featured that the information to be transmitted by using an information transmission line is categorized, and the information is transmitted at a designated information transmission timing determined for the individual category. This information transmission line includes, for example, artificial satellites, radio towers and optical fibers.

In the transmission information to be transmitted in this method, it is preferable to add a label including descriptor, name, attributes and creator (or information distributor) of the information, and the category information and the version information to the data information to be transmitted.

It is effective to categorization the information in dependence upon the update frequency and/or exigency of the information content. In this case of categorization, it is preferable to determine the timing for information transmission by considering the usage condition of the information transmission line in dependence upon the categories determined by the update frequency and/or exigency of the information content. The classes of categorization are defined to be (1) information having a large volume and updated in relatively low frequency, (2) information updated more frequently than the information (1) is, (3) information related to the information (1) and (3) or additional information changing its contents more vastly than the information contents in (1) and (2), and information sent out for the broadcasting business, and (4) information of importance having the extremely high exigency, and it is desirable to broadcast the information categorized in this manner at a designated timing adequate for the individual category. It is more convenient to send the information categorized in (1) once in designated number of days, send the information categorized in (2) when the information transmission line is in relatively low traffic in a designated day, for example, in the nighttime, send the information categorized in (3) timely when the information is generated, and send the information categorized in (4) promptly when the information is generated.

Another embodiment of the information transmission method in the present invention has such a feature that the information contents for broadcasting are compressed in a unused time slot of the unoccupied information transmission channel and a different information other than those broadcasting contents is sent in a time division mode through a dedicated information transmission line assigned for the information transmission for delivering information for the purpose of the broadcasting business.

(Information Receive Method)

One embodiment of the information receive method in the present invention has such a featured that the information to be sent by using an information transmission line is categorized, and the information is transmitted at a designated information transmission timing determined for the individual category. It is effective to apply artificial satellites, radio towers and optical fibers to this information transmission line.

It is preferable to categorize the information by considering the importance, exigency and the occurrence in information update, that is, in dependence upon the update frequency and/or exigency of the information content. In this case of categorization, it is also preferable to determine the timing for receiving the information by considering the usage condition of the information transmission line (that is, traffic) in dependence upon the categories determined by the update frequency and/or exigency of the information content. The classes of categorization are defined to be (1) information having a large volume and updated in relatively low frequency, (2) information updated more frequently than the information (1) is, or modified or additional information related to (1), (3) information related to the information (1) and (3) or additional information changing its contents more vastly than the information contents in (1) and (2), and information sent out for the broadcasting business, and (4) information of importance having the extremely high exigency, and it is desirable to receive the transmitted information in a broadcast mode so categorized at a designated timing adequate for the individual category in dependence on the operational condition of the receive-side information processing system. It is more convenient to receive the information categorized in (1) at a time slot when the receive-side information processing system does not operate actively, receive the information categorized in (2) by using an unoccupied time slot of the receive-side information processing system, receive the information categorized in (3) timely when the information is generated, and receive the information categorized in (4) promptly when the information is generated.

Another embodiment of the information receive method in the present invention has such a feature that the information is captured in a designated timing determined in dependence on the individual categories when receiving the categorized information contents through the information transmission line. It is practical to apply artificial satellites, radio towers and optical fibers to this information transmission line in similar ways.

In either of information transmission and information receiving, the categorization for the information contents in which the information categorized in (1) is updated once in a designated number of days, the information categorized in (2) is updated in the nighttime in a designated day, the information categorized in (3) is updated timely when the information is generated, and the information categorized in (4) is updated promptly when the information is generated enables the information transmission line to be used effectively and contributes to the highly efficient operation of the overall system.

In the information receiving method of the present invention, an information service can be provided so that the information sent from artificial satellites and radio towers may be received by the ground-based fixed receiving station directly through wireless transmission or through wired transmission such as electric wires and optical fibers (through ground-based infrastructure such as Internet), and that a mobile station having an apparatus in which this information is received through wireless transmission such as artificial satellites and radio towers may capture the information also from the ground-based fixed receiving station. In this case, such a function as information service station may be provided at the ground-based fixed receiving station, which will be described below in a separate article.

(Receive-side Information Processing System)

In one embodiment of the receive-side information processing system, what is proposed is an apparatus for receiving and outputting the information transmitted in the above method in which the information is processed in a designated timing determined in dependence on the individual categories when capturing the categorized information contents sent from the information transmission source in a broadcast transmission mode. In this case, it is practical that the receive-side information processing system is embedded, for example, in a car navigation terminal.

In one embodiment of the receive-side information processing system, a system capturing the information at a information capturing timing determined in dependence on the individual categories when capturing the categorized information through the information transmission line, in which (1) the system has a primary buffer unit for storing the transmitted information independent of the operation status of the receive-side information processing system; a main memory unit for storing the information used as the output information from the receive-side information processing system; and an input and output unit, and the information formed by editing and processing the information stored in the primary buffer unit is used as the information to be stored in the main memory unit, (2) in the receive side, based on the label information and version information added on the transmitted information, whether those information should be captured for the information system is judged, and whether the information should be read, skipped and/or aborted, the information judged to be read is stored sequentially into the primary buffer unit in the information processing system (in which, it is preferable to use a registration information recording medium for specifying the information contents to be captured in the receive-side information processing system), (3) the registration information recording medium is used for storing the information for defining the chargeable information contents available to be captured in the receive-side information system, the label information of the chargeable information captured already in the receive-side information system, and the accounting information such as charge transfer account information used for capturing the version information and the chargeable information newly available (for example, one or more combinations of nominal person name, banking account number and credit card number), or (4) the information stored in the primary buffer unit is edited and processed in a unoccupied time slot of the receive-side information processing system at a timing directed by the category information in dependence on the category information added to the designated information and stored newly into the main memory unit in the receive-side information processing system or the older version of information already stored in the main memory unit is revised (receive and capture process).

The registration information recording medium used here is, for example, an IC card. This registration information recording medium preferably stores the information specified among the information distributed without charge by the user of the receive-side information processing system, and defines the free distribution information newly read into the receive-side information processing system, and records and registers the label information and version information of the free distribution information read into the receive-side information processing system.

In the embodiment of the present invention, it is effective that the chargeable information registration and free information registration to be read into the receive-side information processing system can be performed by an identical registration information recording medium, the chargeable information registration and free information registration to be read into the receive-side information processing system can be performed individually by separated registration information recording media, and that the chargeable information registration to be read into the receive-side information processing system may be performed by one registration information recording medium and the free information registration may be performed by the other writable recording medium installed inside the receive-side information processing system.

It is convenient for those receive-side information processing systems to be established as (1) an embedded system in the mobile handy terminal and the navigation terminal for mobile stations such as, automobile, ship and aircraft, (2) an embedded system in the handy radio, handy television set, or the on-board radio or television set for the mobile station such as automobile, (3) an embedded system in the audio visual equipment or the indoor stationary equipment, or (4) an embedded system in the cellular phone, PHS (Personal Handy phone System), PDA (Personal Digital Assistance) having communication facility and GPS (Global Positioning System).

(Receive-side Information Processing Apparatus)

One embodiment of the receive-side information processing apparatus in the present invention is characterized as an apparatus used for the information receiving method and receive-side information processing system of the present invention, in which the received information stored in the main memory unit are selected, edited and processed, and output in a required output format (in voice only, in voice and simplified image, or in voice and detailed image information). In this case, this apparatus is preferably for selecting and editing the information required for the driver among the received information stored in the main memory unit, and providing this as voice, and is preferably loaded on the mobile stations. In addition, it is convenient that this apparatus is loaded on the mobile station in which the simplified image information enabled to be easily recognized by the driver is also loaded as additional information for the driver on the mobile station as well as voice information, this apparatus is loaded on the mobile station in which the detailed image information used for the fellow passengers is output in synchronization with the information output for the driver, or that this apparatus is loaded on the mobile station in which the information required by the fellow passengers and used for them is output in a specified mode.

(Information Procurement Method)

One embodiment of the information procurement method in the present invention is characterized as a method in which the transmission information from the transmission source is received by the fixed receiving station, and the transmission information is also received from the fixed receiving station by the mobile station having an apparatus for receiving the transmission information. In this case, a typical transmission source includes an artificial satellite or a radio tower. In addition, in this information procurement method, in case that the information processing device at the mobile station has only a receiving function, it is desirable that the registration information recording medium loaded into the information processing apparatus is extracted and then inserted into the input apparatus and rewrite apparatus for the information stored in the registration information recording medium, the information object registered in the registration information recording medium and the information object stored in the information processing device at the fixed receiving station are compared and the information to be sent to the information processing device at the mobile station is determined at the fixed receiving station, and that this information so determined should be sent out after the registration information recording medium is inserted again into the information processing device at the mobile station. When there is any information not registered in the registration information recording medium but located at the information processing device of the fixed receiving station, and this information is captured into the information processing device at the mobile station on demand of the user at the mobile station, it is desirable to initiate the accounting routine by inserting the registration information recording medium into the registration information recording medium reading and writing apparatus, if this information is chargeable. Otherwise, as for another embodiment, in case that the information processing device is a bi-directional communication system having a transmit-receive device, it is also effective that the information processing device at the fixed receiving station captures the class and version of the information stored in the information processing device at the mobile station, and that the information at the fixed receiving station is judged to be newer than the other one, this new information is transmitted.

(Information Transmission Method)

One embodiment of the information transmission method in the present invention is characterized as a method in which plural fixed receiving stations for receiving the transmission information from the transmission source have a device which receive and store the latest version of all the information sent out from the transmission source, and search the information requested by the individual mobile stations, and transmit this information to the receive-side information processing system of the individual mobile station, and the latest information can be transmitted to the information processing systems at the mobile station and those at the receive-side even through the fixed receiving station. In this case, it is effective that the fixed receiving station also has a function for capturing the latest version of all the information identical to those sent out from the transmission station.

It is also desirable that the label information, version information of all the information stored individually in the plural fixed receiving stations, and the service status reports and operation status reports of those fixed receiving stations are made available to be captured into the information processing system formed for managing those fixed receiving stations through wireless or wired information transmission lines. In addition, in case that the information stored individually in the plural receiving stations is not updated for the latest version or loses some contents, it is preferable that the information to be updated is sent out again from the information processing system used for management inside the individual fixed receiving station by using a wireless or wired information transmission system, and that the information in the individual fixed receiving station is updated and revised.

In case that the information processing device at the mobile station is a bi-directional communication system having a send and receive function, it is preferable that the information processing device at the fixed receiving station captures the class and version of the information stored in the information processing device at the mobile station, and that, in case that the version of the information at the fixed receiving station is newer than the other, this new information is transmitted.

(Information Distribution Method)

One embodiment of the information distribution method in the present invention is characterized as a method used for the system in which the fixed receiving station receives the transmission information from the transmission source, and the mobile station having a device for receiving this transmission information can capture the transmission information also from the fixed receiving station, in which the individual fixed receiving stations are installed at gasoline stations, car maintenance shops, parking areas or stores. In this case, the information processing device at the mobile station is a is a bi-directional communication system having a send and receive function, it is preferable that the information processing device at the fixed receiving station captures the class and version of the information stored in the information processing device at the mobile station, and that, in case that the version of the information at the fixed receiving station is newer than the other, this new information is transmitted.

(Information Service Station)

An information service station is one embodiment of the ground-based fixed receiving station in the specification of the present invention, which is characterized as a station which has an information processing device having an information transmission means using a receiving facility for wireless communication with the artificial satellites (used for broadcasting or data communication) and the radio towers, or using a ground-based information transmission system, in which the information processing device has a function that enables to exchange the send and receive information including the registration information and the information requested by the user of the mobile station directly or indirectly via the registration information transfer medium with the mobile station. In this case, it is preferable that the above mentioned facility and information processing device is installed at such site as gasoline stations, car maintenance shops, parking areas or stores over which automobiles often come and stop. It is preferable that (1) the above mentioned information processing device has a device which has an information transfer medium loading apparatus, and compares the information object registered in the medium taken off from the mobile station and loaded on the medium loading apparatus with the information object stored in the information processing device itself, and then determines the information to be sent via the above mentioned medium to the mobile station, or (2) the information processing device has a function which captures the class and version of the information stored in the information processing device at the mobile station via the information transfer medium, and, in case that the version of the information at the fixed station is newer than the other, this newer information is used for updating and registering the contents in the above mentioned medium.

In case that the information processing device at the mobile station has only a receive function, it is preferable that the registration information recording medium (hereinafter referred to as IC card and the like) loaded in the information processing device is extracted and then inserted into the registration information recording medium information input/output apparatus (hereinafter referred to as IC card reader and the like) of the information processing device provided at the fixed receiving station, and the information object stored in the IC card and like and the information object stored in the information processing device at the fixed receiving station are compared and the information to be sent to the information processing device at the mobile station is determined, and then, the information so determined is transmitted after the IC card and like is loaded back into the information processing device at the mobile station. In case that the information not registered in the IC card and like is found in the information processing device at the fixed receiving station, and that this information is required to be captured by the information processing device at the mobile station on demand of the use at the mobile station, it is effective that, it is desirable to initiate the accounting routine by inserting the IC card and like into the IC card reader/writer and like at the fixed station, if this information is chargeable.

And furthermore, in case that the information processing device is a bi-directional communication system having a transmit-receive device, it is practical that the information processing device at the fixed receiving station captures the class and version of the information stored in the information processing device at the mobile station, and that the information at the fixed receiving station is judged to be newer than the other one, this new information is transmitted.

(Difference Between the Function at the Send Side and the Function at the Receive Side)

The send side performs a transmission operation in dependence on the categorized set of information. For example, the information categorized as Category 1 is transmitted once a week, the information categorized as Category 2 is transmitted once a day, the information categorized as Category 3 is transmitted once every 5 minutes, and the information categorized as Category 4 is transmitted promptly when the information generates.

The receive side stores the information required for itself temporarily in the primary butter, and transfers this information to the main memory unit at an appropriate timing (three-mode receive processing).

For example, the information categorized as Category 1 is processed while the system for receiving the information is not operated (at standby state), the information categorized as Category 2 is processed at the same timing as Category 1 is, the information categorized as Category 3 is processed at the time slots when the system for receiving the information is not occupied for processing, and the information categorized as Category 4 is processed promptly.

Now, embodiments of the present invention will be described by referring to attached drawings.

(Embodiment for Information Transmission Method)

FIG. 1 illustrates a structure of the transmission data and its transmission timing. In the example shown by FIG. 1, data with its contents not changed so much momently (hereinafter referred to as data base) are transmitted at an unoccupied time slot for the radio wave (relatively less occupied time slot and/or nighttime), and only the differential and additional data from this base line data are transmitted timely as needed.

In other words in this example, by means that the information is categorized as one of plural categories in associated with the characteristic of the information (exigency and importance of the information in time domain), and the timing for information transmission is controlled in accordance with its category, and thus that an effective use (equivalent to an increase in the capacity usage ratio) of the information transmission line can be attained, downsizing of the communication cost can be established. At first, the individual information is categorized into one of plural categories according to the characteristic of the individual information.

Tables 1 shows an example of categorized groups of the information and their transmission timing.

TABLE 1

| No. | Information Data Category | Information Classification | Information Example | Information Transmission Specification (Transmission Timing, for example) |
|---|---|---|---|---|
| 1 | Category-1 | Information data having a large volume and updated in relatively low frequency | Relatively fixed information such as road map information and its related information in association with the road information; for example, the location information of signals, gas stations, convenience stores, landmark buildings, restaurants and hotels is Category | Transmitted by using such a time slot as the information transmission line is least occupied (for example, transmitted periodically once a week or transmitted in the night from Sunday to Monday) |
| 2 | Category-2 | Information data updated more frequently than the information data categorized in Category-1, or the modification or additional data for the information data categorized into Category-1 | Predefined information with its update frequency being not high, and without real-time transmission required, such as event information, advertising information of restaurants and fair information. | Transmitted in a time slot when the information transmission line is relatively unoccupied in a day (for example, in nighttime) |
| 3 | Category-3 | Information changing its contents in real-time | Ever changing information related to the information categorized into Category-1 or Category-2 (current road traffic information and the like), or digitized broadcasting information | Transmitted timely when the information is generated (for example, transmitted every 5 minute in day time, or every ten minute in night time) |
| 4 | Category-4 | Emergency Information | Important information having high exigency such as information reporting disaster status | Transmitted immediately when the information is generated. Information categorized into Category-4 is transmitted with higher priority by suspending the transmission of the information categorized into categories other than Category-4. |

For example, the label information including the class, name, responsible organization and summary of the information, the categorization information defined in association with the importance and exigency of the information, and the version information indicating an identifier corresponding to the recently revised information and data are added to the individual unit of all the information to be transmitted. The timing for transmitting the information is determined based on the categorization information among this set of information.

All the information are categorized into any one of the categories including, for example, Category 1 defined for the information in which the amount of the information is extremely large but its revision hardly occurs ever; Category 2 for the information in which occurrence in revising the information is relatively high, or the revision information and additional information for the information in Category 1 are included; Category 3 defined for the information which changes every hour or minute related to or additional to the information in the Categories 1 and 2 and is sent out for the purpose of broadcasting business; and Category 4 defined for the emergency information which is required to be transmitted with higher exigency for security. The information in connection with the signals for radio broadcasting and the signals for television broadcasting is basically categorized into Category 3 defined above.

Next, the categorized information is transmitted individually for each category and with an optimum information transmission method selected automatically for minimizing the cost. For example, an example of the logic for determining the transmission timing is shown in FIG. 1 which illustrates the structure of the transmit data and its transmission timing.

The transmit data 1 is composed of category information, label information, version information and information data. At the decision step 2, in responsive to the arrival of the transmit data 1, the information decided to be categorized into Category 4 is processed for data transmission with the highest priority so that, even if the information categorized in Categories 1, 2 and/or 3 is processed for data transmission, data transmission for those data may be interrupted (in Step 7). If the information is judged not to be categorized into Category 4, the decision step 3 judges the information to be categorized into Category 3, and then, the data transmission operation is performed for the information categorized into Category 3 timely at a designated time interval or in dependence on the state of the generation of the information in considering the state of the generation in the information categorized in Category 3 (for example, every 5 minute while daytime when the occurrence of information update is relatively higher, or every 10 minute while nighttime when the occurrence of information update is relatively lower) when the generation of the information categorized into Category 3 generate (Step 8). In case that the information categorized into Category 1 or 2 is processed for transmission operation at this time, this transmission operation is interrupted and then the information categorized into Category 3 is transmitted in preference to those information.

Even if the information categorized into Category 3 does not change substantially (for example, the current traffic congestion state in the vehicle traffic information is found to be almost the same as that in the previous time for transmission operation), the data is transmitted in principle at a designated time interval. This makes it possible to provide an up-to-date information relatively promptly even in case that the receive-side information system is turned in the operational condition in several minutes before.

Even in case that the information transmission is basically so defined as to be performed periodically, it is certainly possible to make the transmission interval longer or skip a single transmission operation if the information to be transmitted does not change its contents.

In case that it is estimated that the transmission operation for the information categorized into Category 1 or 2 will be competed in a few moment (for example, in one or two minutes), (for example, in case that the remaining volume of data to be sent is small), it is allowed that the transmission operation for the information categorized into Category 3 is made arranged after the completion of the transmission operation for the information categorized into Category 1 or 2.

The information for the radio or television broadcasting business is categorized into Category 3, to which a dedicated broadcasting channel is assigned to the individual broadcasting station (there may be such a case that plural broadcasting channels are provided concurrently).

In case that the system is configured based on conventional analog technologies, the information (analog signals) currently transmitted is received by the receiver concurrently with the conversion into the output information (analog voice and analog image) and their output operation.

In the progressive transition to the digital platform in today's broadcasting system, however, the same amount of information with a several fraction of the radio frequency band required for the conventional analog broadcasting system can be transmitted in the digital platform, and information compression technologies developed in progress can make the time spent for information transmission extremely shorter than the time required for playing the received information actually at the receiver side.

For example, when the digital information corresponding to the music played for 5 minutes is transmitted, the time spent for information transmission is approximately ⅕ of the conventional time spent for information transmission, depending on the music information contents to be transmitted, if such an information compression technology that enables to compress the transmission information by ⅕ can be assumed to be applied, which provides free spaces in the information transmission channel.

Assuming such a case that another information is transmitted at unoccupied time slots on the information transmission channel, the information transmission channel can be used efficiently. More specifically, for example, five sets of music information are transmitted concurrently, and the user at the receive side can select one of those music information sets and listen to his or her favorite music, which can be stated as multi-channel operation with a single channel transmission line.

It is certainly possible to provide several kinds of services by using this unoccupied time slot for the information transmission line and with an identical information transmission line of the single broadcast station, and thus, the information categorized into Category 1 or 2 and the information categorized into Category 4 can be transmitted.

Next, in case that the procedural step reaches the decision step 4, which means that the information is judged to be categorized into Category 2, the information is transmitted while the time slot when the information transmission line is relatively free and unoccupied in a day (for example, in midnight) (Step 9). It is allowed that the information may be transmitted in the daytime when the load on the information transmission line is relatively low.

In case that the transmission operation for the information categorized into Category 2 is started, the transmission operation for the information categorized into Category 1 is suspended for a while, and then, its operation is started after the transmission operation for the information categorized into Category 2 is competed.

In case that the volume of the information categorized into Category 1 is large and that the transmission operation is not completed in a scheduled time slot, it is allowed that its transmission operation may be made continue by using unoccupied time slots of the information transmission line, or that its transmission operation may be made restart in nighttime on the following day by using an unoccupied time slot after the transmission operation for the information categorized into Category 2 is completed.

And then, in case that the procedural steps arrive at the decision step 5, the information categorized into Category 1 is transmitted by using such a time slot as the information transmission line is least occupied (for example, in the night from Sunday to Monday) (Step 10).

If the information to be sent is not contained in any category, it is judged that the category information is incomplete, and that some additional category information is added at Step 6, and then the procedural steps go back before the decision step 2.

According to the above procedures, as the overall utilization of the information transmission line can be increased and its equalization is attained, a downsizing of the overall cost of the information transmission can be established. (Example of Information Receive and Output Method)

The information categorized in the above described manner is captured into the receive-side information processing system basically by the procedures shown in Table 2, and used as information data for various procedures.

TABLE 2

| No. | Information Data Category | Example of Information Processing in the Receive-side System | Timing for Information Acquisition into Main Memory Unit | Remarks |
|---|---|---|---|---|
| 1 | Category-1 | Whether the receive information should be captured in the receive-side system or not is judged by referring to the label information added to the body of the information, and then, only if the receive information is judged to be required to be captured, it is stored in the primary buffer. In case that the older version of information having an identical label information is already stored in the main memory unit, this older version of information is rewritten over by the latest version of information captured at this point and temporarily stored in the primary buffer. In case that the information having an identical label information is not stored in the main memory unit, the receive information is written newly into the main memory unit. | When the load of the receive-side system is minimum, the information stored temporarily in the primary buffer is written in the main memory unit. For example, this operation is performed when application programs in the receive-side system are suspended. | If the receive-side system is carried on the automotive vehicle, the information categorized into Category-1 is written in the main memory unit when this system is not operated by the driver and the passengers (the engine switch is turned off or the vehicle is parked). |
| 2 | Category-2 | The receive information is written into the primary buffer in the similar manner to Category-1. In case that the information newly stored in the primary buffer is not found to be already stored in the main memory unit, this information is written into the main memory unit. In case that the information newly stored in the primary buffer is found to be any modification or addition to the information already stored in the main memory unit, this modification and addition is processed for the information already stored. The older version of information is made stored temporarily for a single generation in order to enable to report to the user explicitly in a specified display area about the fact that the information obtained by | The information is written into the main memory unit at a time slot when the receive-side system is not occupied. | When the user issues or has issued a request for output of his or her preferential information, its latest version is provided for output. |

TABLE 2-continued

| No. | Information Data Category | Example of Information Processing in the Receive-side System | Timing for Information Acquisition into Main Memory Unit | Remarks |
|---|---|---|---|---|
| | | this modification is such a updated information as corresponds to its original older version of information. | | |
| 3 | Category-3 | The receive information is written into the primary buffer in the similar manner to Category-1. The information already stored in the main memory unit is overwritten promptly with the information newly stored in the primary buffer. The unmodified version of this information is made stored temporarily in order to enable to report to the user explicitly in a specified display area about the fact that the information obtained by this modification is such a updated information as corresponds to its original older version of information. (The number of versions to be stored temporarily is determined based on the size of the main memory unit, or determined manually by the user at the receive-side system. | In case that the output operation of the designated information in required at the receive-side system, this information is rewritten into the main memory unit. In case that the request for output of this information is not defined at the receive-side system. However, in case that the request for output of this information is issued before the rewrite operation, the output operation is performed after the rewrite operation of the designated information. | As a result, when the request for output of information is issued (or being issued) by the user, the latest information is always provided for output. |
| 4 | Category-4 | The receive information is written into the primary buffer in the similar manner to Category-1. The information already stored in the primary | Immediately after the information categorized in Category-4 is received, this information is written into the main memory unit immediately; | For example, even when the other information is provided for output at the receive-side system (for example, playing a music data), the |
| | | buffer area is written promptly into the emergency data area of the main memory unit (in case that its older version is already stored in this area, this older version is overwritten), and its output is provided promptly from the output device (in the form of voice information and video image information). | and if the mobile station (for example, an automobile) is in an operating state (for example, the ignition key is inserted), this information is provided for output with the highest priority independently of the state of the receive-side system (for example, even if the switch for the receive-side system is turned off, its switch is forced to be turned on. | Category-4 information is urgently provided for output by interrupting the output operation of the other data (for example, an operation for playing the music data). |

FIGS. 2 to 6 are flowcharts of the contents shown in Table 2. At first, by referring to FIG. 2, the operation for the transmission of the received information from the primary buffer to the main memory is described mainly for the information categorized into Category 4.

The receive data 1 is composed of category information, label information, version information and information data contents. The received data 11 is processed at first for checking its label information in order to judge whether it is one of the registered information which should be captured into the receive-side information processing system (in the decision step 12). The decision step 12 identifies the information to be allowed to be captured inside the receive-side system. If this information is judged not to be one of the registered information contents, this information is skipped (in the procedural step 18) and thus, is not captured into the system.

In case that the transmitted information is chargeable, the registered information for the receive-side information processing system is such an information contents as contracted beforehand to be served. In case that the transmitted information is without charge, though this information can be unconditionally captured basically as contracted registered information, it is allowed to delete this information which the user determined to be unnecessary (for example, X-rated program contents) including from the registered information.

Though the registration information for the chargeable information may be recorded in an IC card and the like, the registration information for the free-of-charge information contents can be defined each time as the registration information dedicated for the specific user identified temporarily or newly for the system by using a personal identification signal obtained from his or her retina or a personal identification IC card. It is allowed to modify, add and delete the registration information for the free-of-charge information contents while operating the receive-side information processing system. The user identification information mentioned above can be used in order to customize the output format of the information for the individual user.

Thus, for example, also in case that plural users use an identical receive-side information processing system installed on a single automobile, the individual user ca operates this system under the dedicated environment defined beforehand for the individual user (for example, the size of display fonts may be increased or the voice output level may be adjusted automatically).

In the receive-side information processing system, according to the registration information defining whether the information contents registered beforehand in the above described manner is allowed to be captured or not, the receive information (more precisely, the label information added to the receive information) is checked, and then, only the selected information allowed to be captured in the receive-side information processing system is received and stored in the primary buffer (Step 13).

At this time, as the information categorized into Category 4 is an emergency information, this information is immediately written in the emergency data area of the main memory unit, and the output operation is performed (Step 19), in which the information is output in a predefined format (voice, image (character) information or an integrated information of voice and image). In Step 19, the information written in this emergency data area is immediately output in a predefined format (voice, image and the like). Even if some procedures other than this operation are executed in progress, this emergency operation is executed with the highest priority. The other procedures may be suspended.

Even if the output switch of the receive-side information processing system is not turned on (it is assumed that the system switch system and the actuating switch are turned on), the receive-side information system receives the information categorized into Category 4 concurrently with the automated operations for turning on the output switch and providing the information categorized into Category 4 as long as the automated output mode for the information categorized into Category 4 is selected (the receive-side information system is normally set to be this mode).

If the decision step 14 for judging whether the receive information can be categorized into Category 4 concludes "NO", the procedural step goes to the decision step 15 for judging whether the receive information is categorized into Category 3 or not. If the decision step 15 also concludes "NO", then the procedural step goes to the decision step 16 for judging whether the receive information is categorized into Category 2 or not, and consecutively, if the decision step 16 consecutively concludes "NO", the procedural step goes to the decision step 17 for judging whether the receive information is categorized into Category 1 or not, in which, if those decision steps conclude "YES" respectively, their own subsequent steps are selected next. If the receive information is judged not to be the information categorized into Category 1, it is concluded that the category information is incomplete or incorrect, and then the procedural step 20 for adding temporary category information to the receive data is selected and executed next, and then the procedural step goes back before the step 12.

In the receive-side information processing system, its output scheme for the information categorized into Category 4 can be set selectively to one of three modes including "automated output rejection mode" and "automated related information output mode" as well as "automated output mode" described above.

"Automated output rejection mode" is a mode in which the output of the information categorized in Category 4 is rejected urgently and automatically, and the output operation is never operated if the output switch of the receive-side system is OFF.

"Automated related information output mode" is a mode in which the automated output of the information categorized in Category 4 is rejected in such a case that the point of its information generation is located far from the current point of the user, for example, the emergency information for Hokkaido is not output automatically to the user in the automobile driving in Tokyo metropolitan area.

The functions of the switches for defining the operation of the receive-side information processing system are listed in Table 3.

TABLE 3

| No. | Switch Name | Classification | Function | Remarks |
|---|---|---|---|---|
| 1 | System Switch | Hardware Switch | Function for turning on the electric power supply to the receive-side system and starting the system operation. When this switch is turned on, the transmission and receive operation for the information data is enabled, and the transmission and receive operation for the information data is initiated automatically. | In case of on-vehicle system, this system switch is generally kept ON. |
| 2 | Operation Switch | (Hardware Switch) | State detection switch for making the receive-side system recognize an existence of driver and/or passengers in the cabin of the automobile. | When the ignition key is inserted, this operation switch is also made turned on automatically. |
| 3 | Output Switch | Hardware Switch | Switch for the user allowed to turn on basically when he or she explicitly intends to use the receive-side system. | (corresponding to the ON/OFF switch for an ordinary radio receiver) |
| 4 | Category-4 Information Output Mode Setting Function | Software Switch Function | 1. Function for setting the output method for the information categorized into Category-4, including "Automated Output Mode" (*), "Automated Output Prohibit Mode" and "Automated Output Only for Related Information". 2. Function for setting the output format of the information categorized into Category-4, including "Independent Output": provided for output by interrupting the contents currently served by the output operation(*) and "Super-positioned Output": provided for | In general, this function is operated with a display panel (its display screen example is shown in IFG. 10). |

TABLE 3-continued

| No. | Switch Name | Classification | Function | Remarks |
|---|---|---|---|---|
| | | | output by super-positioning with the contents currently served by the output operation.<br>3. Function for setting the output method of the information categorized into Category-4, including "Voice Only", "Image Only" and "Voice and Video" (*).<br>Note: The basic default mode is marked with a symbol *. | |
| 5 | Category-3 Information Output Mode Setting Function | Software Switch Function | 1. Function for setting the output method for the information categorized into Category-3, including "Automated Output Mode" (*), "Automated Output Prohibit Mode" and "Automated Output Only for Related Information"<br>2. Function for setting the output format of the information categorized into Category-3, including "Independent Output": provided for output by interrupting the contents currently served by the output operation(*) and "Super-positioned Output": provided for output by super-positioning with the contents currently served by the output operation.<br>3. Function for setting the output method of the information categorized into Category-3, including "Voice Only", "Image Only" and "Voice and Video" (*).<br>Note: The basic default mode is marked with a symbol *. | In general, this function is operated with a display panel (its display screen example is shown in IFG. 11). |
| 6 | Category-3 Information Output Selection Setting Function | Software Switch Function | 1. Function for setting the area for the information to be provided for output, including "Peripheral Area" and "Specified Area".<br>2. Function for setting classification of the information to be provided for output | In general, this function is operated with a display panel (its display screen example is shown in IFG. 12). |
| 7 | Program Information Output Selection Setting Function | Software Switch Function | Function for setting the classification of the information to be provided for output. | In general, this function is operated with a display panel (its display screen example is shown in IFG. 13). |

Figure 7:
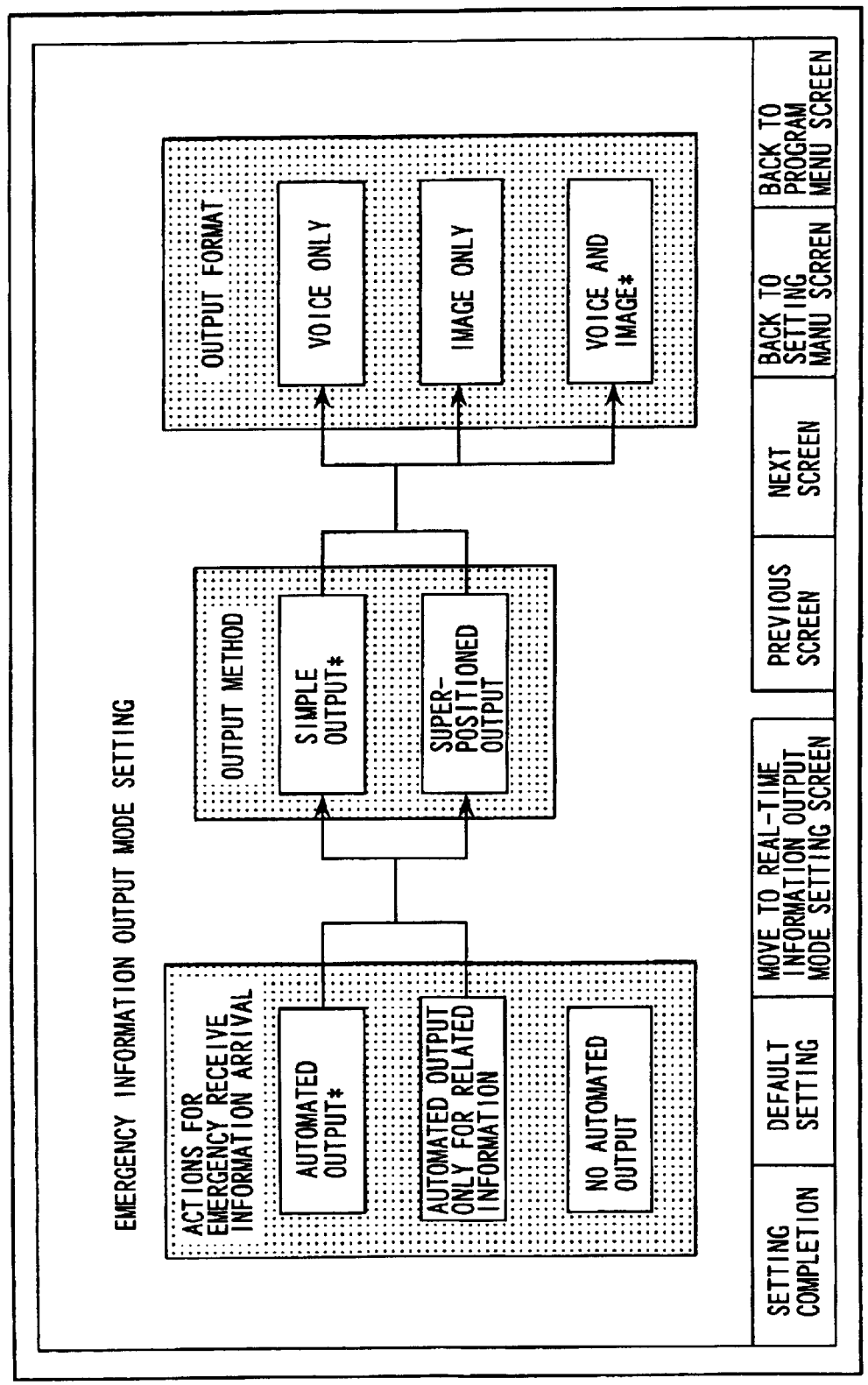
FIG. 7 is a display screen relevant to the apparatus of one embodiment of the present invention.

An examples of human machine interface for setting the information output mode for the information categorized into Category 4 (that is, an example of the display screen image for setting the output mode for Category 4) is shown in FIG. 7. This display screen, is for emergency information output mode setting for Category 4, in which alternatives can be selected in the individual areas for Actions for Emergency Receive Information Arrival, Output Method and Output Format. In the area for Actions for Emergency Receive Information Arrival, one of three alternatives, Automated Output, Automated Output Only For Related Information and No Automated Output can be selected; in the area for Output Method, one of two alternatives, Single Output and Super-positioned Output can be selected; and in the area for Output Format, one of three alternatives, Voice Only, Image Only, and Voice and Image can be selected. If "Automated Output" or "Automated Output Only For Related Information" is selected in the area for Actions for Emergency Receive Information Arrival, the input prompt to the user moves to the area for Output Method, and the user is expected to select the output method, and finally, the user is expected to select the output format in the area for Output Format. The selectable items of "Automated Output", "Single Output" and "Voice and Image" are set as default, which are highlighted or marked distinctively as already selected in the initial state of the system. When the button or switch "□" at the head of the individual selectable item is selected by touch operation and the like, the button or switch changes its display color so as to represent that its item is selected. The command switches for "Setting Completion". "Default Setting", "Move to Real-time Information Output Mode Setting Screen", "Move to Previous Screen", "Move to Next Screen", "Back to Setting Menu Screen" and "Back to Program Menu Screen" are displayed at the bottom of the display screen.

Figure 3:
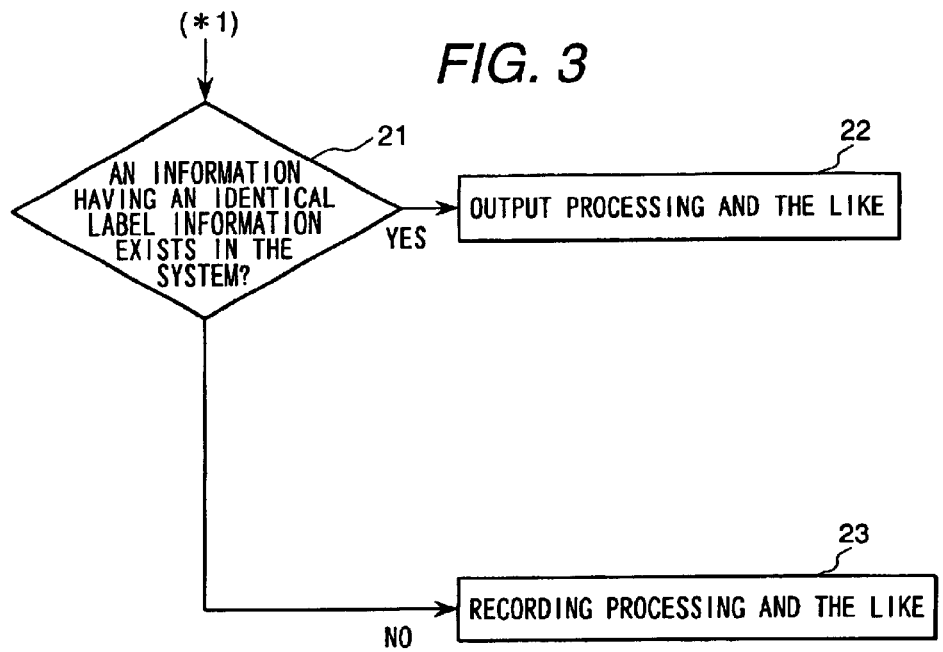
FIG. 3 is a flowchart describing the information transmission and receive method relevant to one embodiment of the present invention.

Next, by referring to FIG. 3, the procedure for transferring the receive data for the Category-3 information, which is selected at Step 15 concluding YES, from the primary buffer to the main memory unit is described.

In the decision step, what is judged is whether an information identical to the label information already exists inside the system or not. If this information exists in the system Step 22 is selected next, and otherwise, Step 23 is selected next.

In Step 22, alternative procedures are prepared and one of them is exclusively selected as the case may be. In case that the version of the information in the receive-side system having an identical label information to the label information of the receive information is identical to the version of the label information of the receive-information, rewrite or overwrite operation of the data is not performed in principle, and the procedure currently being performed (output operation and the like) is made continue as it is. On the other hand, in case that the version of the information in the receive-side system having an identical label information to the label information of the receive information is older than the version of the label information of the receive-information, if the older version of the information corresponding to the newly arrived receive information is occupied for its usage (used for output operation) a message (in voice or image) notifying "New Information Arrival" is provided, and the older information recording area in the main memory unit is rewritten or overwritten with this newly arrived receive information, and then this newly arrived receive information is written into the newly arrived information data area in the main memory unit in order to perform the output operation by this newly arrived receive information; otherwise, if the older version of the information corresponding to the newly arrived receive information is not occupied for its usage, the operations for rewriting the older version of the information into the older information recording area in the main memory unit and writing the newly arrived information into the newly arrived information data area in the main memory unit are performed by using a time slot when the receive-side system is not occupied. If a request for the output operation of this newly arrived information is issued unintentionally prior to this procedure, the above described rewrite operation is executed immediately and the consecutive output operation is performed.

In Step 23, which is such a case that there is no information in the receive-side system having a label information identical to the label information of the newly arrived receive information, this newly arrived receive information is recorded in the newly arrived information data area of the main memory unit by using an unoccupied time slot of the receive-side system in principle. If a request for the output operation of this newly arrived information is issued unintentionally prior to this procedure, the above described rewrite operation is executed immediately and the consecutive output operation is performed.

Figure 4:
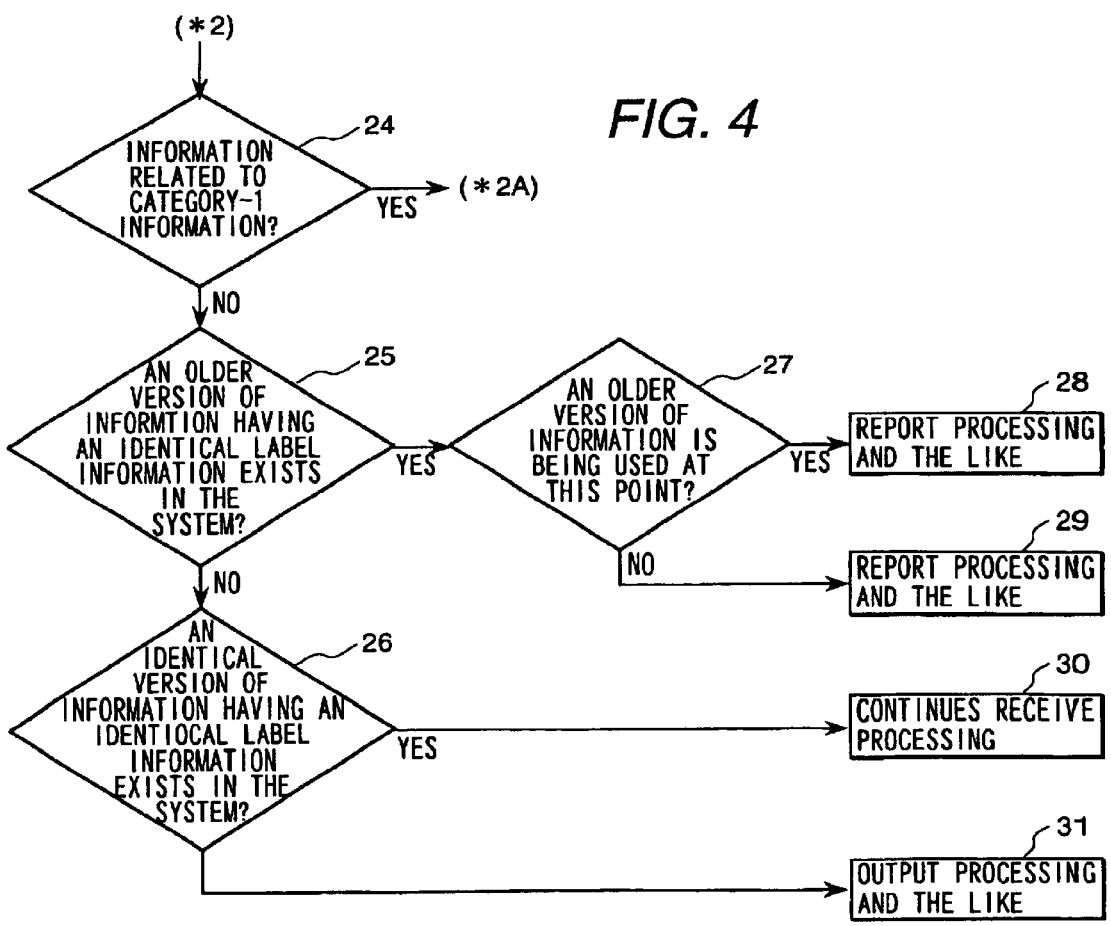
FIG. 4 is a flowchart describing the information transmission and receive method relevant to one embodiment of the present invention.

Next, by referring to FIG. 4, the procedure for transferring the receive data for the Category-2 (Independent Information) information, which is selected at Step 16 concluding YES, from the primary buffer to the main memory unit is described.

Figure 5:
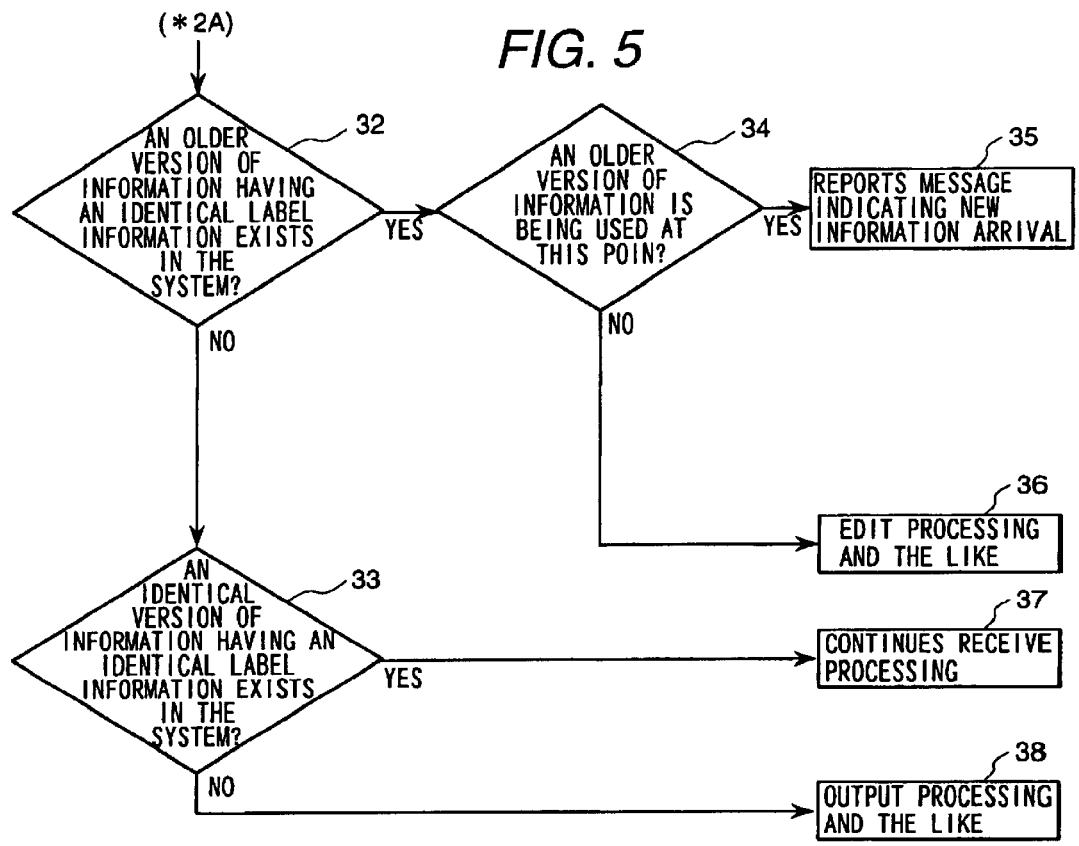
FIG. 5 is a flowchart describing the information transmission and receive method relevant to one embodiment of the present invention.

At first, the decision step 24 judges whether there is any information related to the Category-1 information (whether there exists any modification or addition), and if it concludes YES, then the procedures shown in FIG. 5 is performed next, and if it concludes No, the decision step 25 is selected next, in which what is judged is whether any older version information having a label information identical to the label information of the newly arrived receive information already exists inside the system or not. If the decision step 25 concludes YES, Step 27 is selected next, in which whether the older version information is occupied for its usage or not is judged, and then, if Step 27 concludes YES, the procedure in Step 28 is performed, and otherwise, if Step 27 concludes No, the procedure in Step 29 is performed next. If Step 25 concludes NO, then Step 26 is selected next, in which what is further judged is whether any information having a version identical to the version of the newly arrived receive data and a label information identical to the label information of the newly arrived receive data exists inside the system or not, and then, if Step 26 concludes YES, the procedure in Step 30 is performed next, and otherwise if Step 26 concludes No, the procedure in Step 31 is performed next.

In Step 28, a message reporting "New Message Arrival" is immediately provided in voice and/or image, and, after rewriting the older version of the information in the older information recording area in the main memory unit, the newly arrived information is written into the newly arrived information data area in the main memory unit, and the output operation is performed again by using this newly arrived information principally, in which if the time spent for this procedure may extends longer, this status is also reported to the user.

In Step 29, by using an unoccupied time slot of the receive-side system, the old version of the information is rewritten in the older information recording area in the main memory unit and the newly arrived information is written into the newly arrived information data area in the main memory unit. If a request for the output operation of this newly arrived information is issued unintentionally prior to this procedure, the above described rewrite operation is executed immediately and the consecutive output operation is performed, in which if the time spent for this procedure may extends longer, this status is also reported to the user.

In Step 30, the data rewrite operation is not performed in principle, and the procedure executed at this point is made continue.

In Step 31, by using an unoccupied time slot of the receive-side system, the newly arrived information is written into the newly arrived information data area in the main memory unit. If a request for the output operation of this newly arrived information is issued unintentionally prior to this procedure, the above described rewrite operation is executed immediately and the consecutive output operation is performed.

Next, by referring to FIG. 5, the procedure for transferring the receive data for the Category-2 information (information related to Category-1), which is selected at Step 24 concluding YES, from the primary buffer to the main memory unit is described.

At first, what is judged is whether a older version of the information having a label information identical to the label information of the receive information exists in the system. If it concludes YES, then Step 34 is selected next, in which whether the old version of this information is occupied for use or not at this point; and if Step 34 concludes YES, the procedure in Step 35 is executed next, and otherwise, if Step 34 concludes No, the procedure in Step 36 is executed next. If Step 32 concludes NO, Step 33 is selected next, in which what is judged is whether any information of the same version as the receive information having a label information identical to the label information of this receive information already exists in the system, and if Step 33 concludes YES, Step 37 is selected next, and otherwise, if Step 33 concludes No, Step 38 is selected next.

In Step 35, the update operation for the output information based on the new version of the information is not performed in principle while other procedures are currently being in progress, and thus a message (in voice or image) notifying "New Information Arrival" is only provided. The data rewrite and edit operation in the main memory unit based on the new version of the information is performed separately by using an unoccupied time slot of the receive-side system. In case that the data rewrite operation can be performed in a short time period, the information obtained after the data rewrite operation is made output again.

In Step 36, the data rewrite and edit operation in the main memory unit based on the new version of the information is performed by using an unoccupied time slot of the receive-side system. Even in case that the output request for using this information is issued before executing this rewrite and edit operation, the output operation is based on the older version of the information in principle. In case that the data rewrite operation can be performed in a short time period, the information obtained after the data rewrite operation is made output again.

In Step 37, the data rewrite operation is not performed in principle, and the procedure executed at this point is made continue.

In Step 38, by using an unoccupied time slot of the receive-side system, the newly arrived information is written into the newly arrived information data area in the main memory unit. If a request for the output operation of this newly arrived information is issued unintentionally prior to this procedure, the above described rewrite operation is executed immediately and the consecutive output operation is performed.

Figure 6:
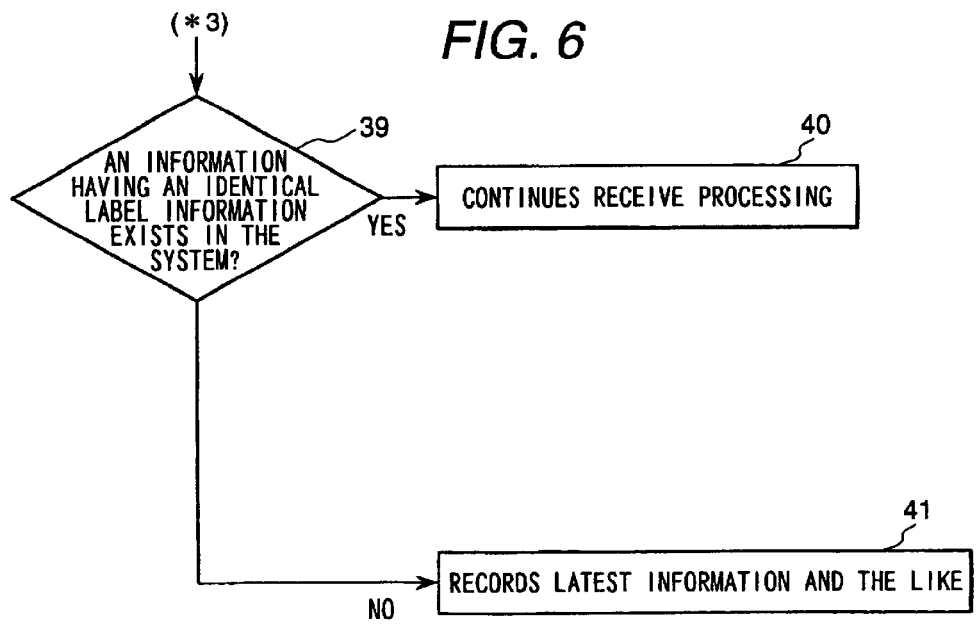
FIG. 6 is a flowchart describing the information transmission and receive method relevant to one embodiment of the present invention.

Next, by referring to FIG. 6, the procedure for transferring the receive data for the Category-1 information, which is selected at Step 17 concluding YES, from the primary buffer to the main memory unit is described.

At first, whether any information having a label information identical to the label information of the receive data already exists in the system is judged in Step 39, and if Step 39 concludes YES, Step 40 is selected next, and otherwise, if Step 39 concludes No, then Step 41 is selected next.

In Step 40, alternative procedures are prepared and one of them is exclusively selected as the case may be. In case that the version of the information in the receive-side system having an identical label information to the label information of the receive information is identical to the version of the label information of the receive-information, rewrite or overwrite operation of the data is not performed in principle, and the procedure currently being performed (output operation and the like) is made continue as it is. On the other hand, in case that the version of the information in the receive-side system having an identical label information to the label information of the receive information is older than the version of the label information of the receive-information, if the older version of the information corresponding to the newly arrived receive information is occupied for its usage (used for output operation), a message (invoice or image) notifying "New Information Arrival" is provided, and the older information recording area in the main memory unit is rewritten or overwritten with this newly arrived receive information, and then this newly arrived receive information is written into the newly arrived information data area in the main memory unit in order to perform the output operation by this newly arrived receive information; otherwise, if the older version of the information corresponding to the newly arrived receive information is not occupied for its usage, the operations for rewriting the older version of the information into the older information recording area in the main memory unit and writing the newly arrived information into the newly arrived information data area in the main memory unit are performed by using a time slot when the receive-side system is not occupied. In Step 40, if a request for the output operation of this newly arrived information is issued unintentionally prior to this procedure, the above described rewrite operation is executed immediately and the consecutive output operation is performed.

In Step 41, in case that there is no information in the receive-side system having a label information identical to the label information of the newly arrived receive information, this newly arrived receive information is recorded in the newly arrived information data area of the main memory unit by using an unoccupied time slot of the receive-side system in principle. If a request for the output operation of this newly arrived information is issued unintentionally prior to this procedure, the above described rewrite operation is executed immediately and the consecutive output operation is performed.

Figure 8:
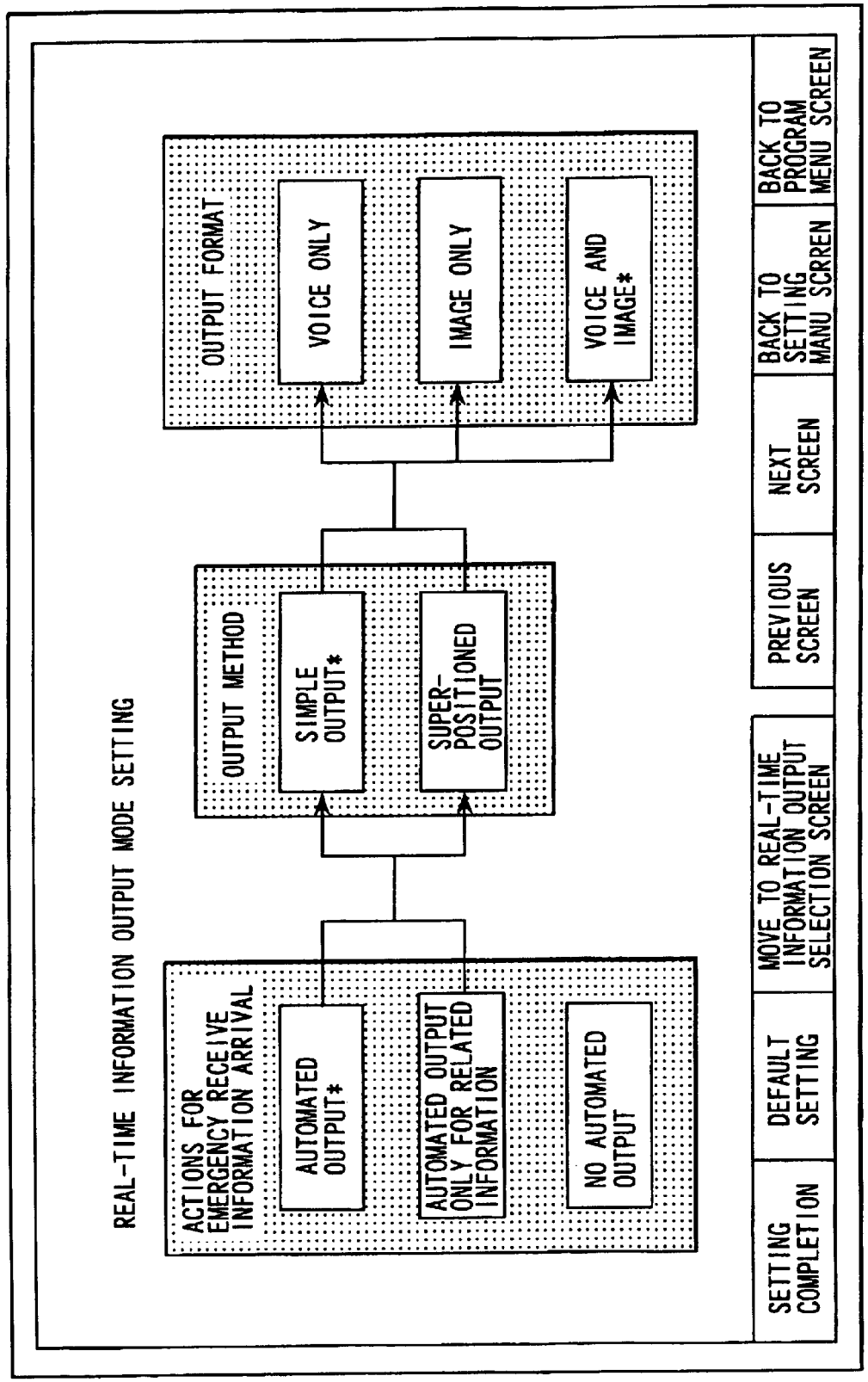
FIG. 8 is a display screen relevant to the apparatus of one embodiment of the present invention.

Next, an example of human machine interface for setting the output mode of Category-3 information is shown in FIG. 8. This display screen is a real-time information output mode setting screen, in which the difference from the display screen shown in FIG. 7 is that the switch for "Actions for Emergency Receive Information Arrival" is replaced by "Actions for Real-time Information Arrival", and that "Go to Real-time Information Output Mode Setting Screen" in the area at the bottom of the display screen is replaced by "Go to Real-time Information Output Selection Screen", in which other features for visual effects in colors when hitting the switches and for default settings are the same as those in FIG. 7.

The Category-3 information changes its output format in principle in accordance with the attributes of the information indicating whether it concerns directly to the use or not. For example, in case of providing the traffic information, only the traffic information covering the area which the user may reach within 2 hours from his or her current location is provided in such a mode that the contents (music and the like) currently provided is suspended (with "Independent Output" of the Category-3 information) or the Category-3 information is super-imposed ("Composite Output"), but the traffic information other than this area is not output. This output format is also controlled by the mode setting.

FIG. 8 shows "an example of the Category-3 information output selection and setting menu screen". This screen is a setting screen used for allowing the user to select his or her necessary information out from the information categorized in Category-3 and to be provided to him or her. This setting is not used in case that the user specifies explicitly the output condition and format (for example, in case that the user may want to get the traffic information for the specific area). General broadcasting programs are basically categorized into Category-3. In the screen shown by FIG. 8, its main display contains the Category-3 information output selection screen, and the screen shown by FIG. 8 can be recalled by hitting the key labeled as "Go To Real-time Information Output Mode Setting Screen". Also in this screen, when the button or switch "□" at the head of the individual selectable item is selected by touch operation and the like, the button or switch changes its display color so as to represent that its item is selected. The keys marked with a symbol * for "Peripheral Regional Information Output" and "Vehicle Traffic Information" are default settings and shown as the color indicating the item already selected at the initial state of the system. In this example, the user is allowed to select "Within A Radius of 200 km" and "Within An Area Reachable in 2 hours or less" as the range of the peripheral region, and if the user selects "Specified Area Information Output", he or she can obtain such registered information for the specified area like "Around Karuizawa Resort Area in Nagano Prefecture" and, "Joh-Shin-Etsu Regional Area". As for the input method for the input field for "Peripheral Regional Information Output" and "Specified Area Information Output", voice and/or pull-down menu inputs are provided to the user.

In addition to "Vehicle Traffic Information" set as default, the use can select his or her preferential information like "Restaurant Information", "Sightseeing Area Information", "Train Traffic Information", "Latest News", "Parking Space Information", "Lodge and Hotel Information", "Amusement Park Information", "Bus Traffic Information", "Flight Information" and "All Information." The empty field in this information area is used as the reserved switch for the information items to be provided in the future. In case that any new information which has not been provided ever to the user is arrived, the color (indicating the item already selected) of its corresponding output selection switch is made altered or made flicker in order to notify the user its arrival.

Figure 9:
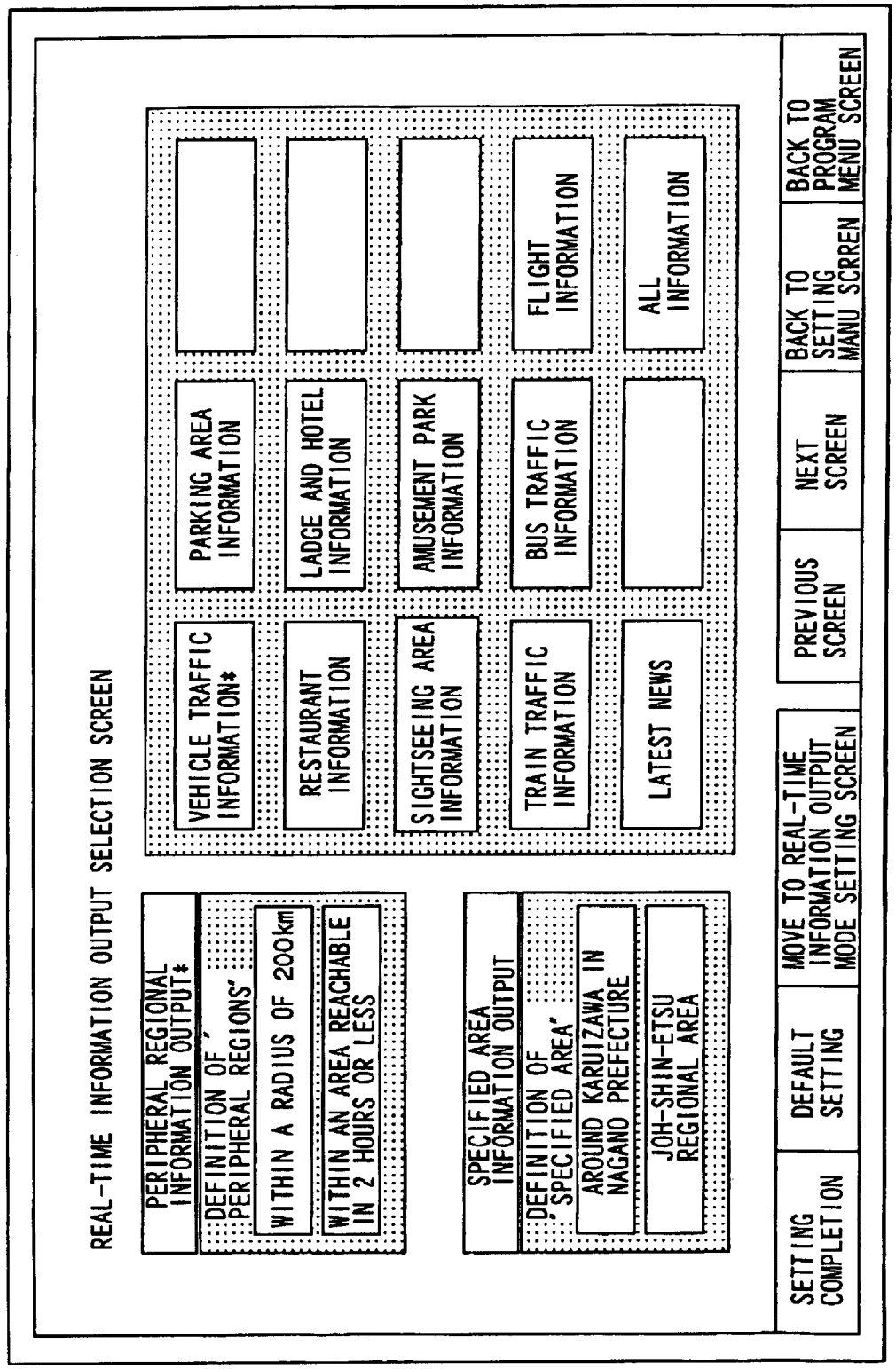
FIG. 9 is a display screen relevant to the apparatus of one embodiment of the present invention.
Figure 10:
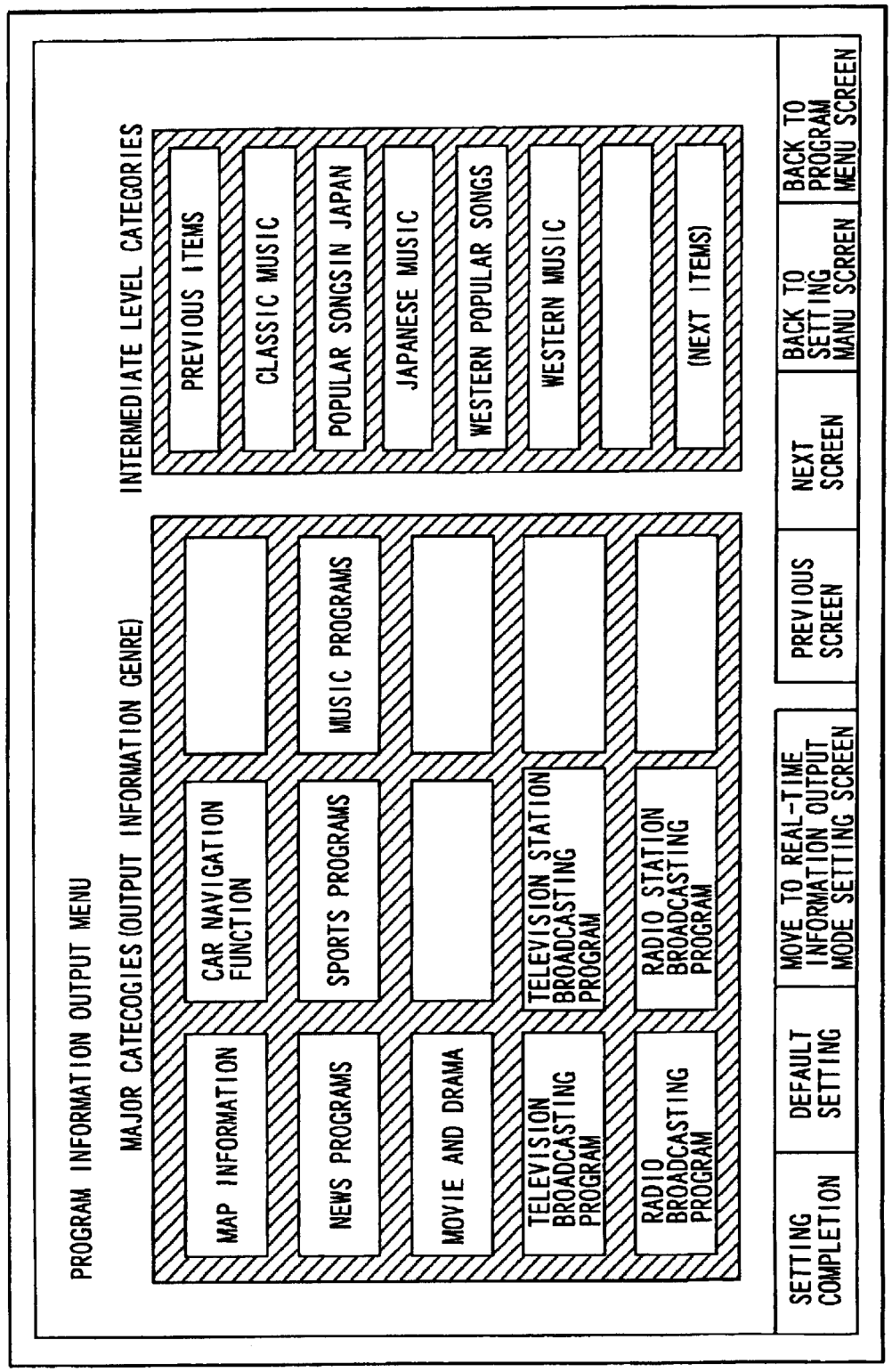
FIG. 10 is a display screen relevant to the apparatus of one embodiment of the present invention.

FIG. 10 shows "an example of Program Information Output Selection and Setting Menu Screen." The bar at the bottom of the screen is the same as the example shown in FIG. 9, and the effect of changing the color of the switch by touch operation is similarly provided. In the current analog broadcasting using analog radio waves, the information being carried on the radio wave at this time is converted into voice and image and provided almost without time delay by broadcasting receiver for radio and television. However, it is expected that the current broadcasting system faces to such a revolutionary innovation by the technical advances in digital systems, the increase in the information transmission speed and the progress in the information compression technologies. That is, the present broadcasting receiver is a kind of real-time-type information output apparatus, but it will become a data-accumulation-type information output apparatus in the future.

The information broadcasted from the broadcasting station is captured temporarily into the receive-side information processing system, and the information with its data contents compressed is decompressed and provided as actual voice and/or image format. Thus, in the receive-side information processing system, major two functions, the first function for storing temporarily the data carried on the receive radio wave, and the second function for converting the data temporarily stored into the signal formed in the multi-media (voice and/or image) enabled to be recognized by the user, are required to be operated independently.

The information to be received is an information made by the information distribution source, but it is not necessarily identical to the information which the user wants to obtain at this point. Therefore, the function for receiving the information and the function for outputting this information can be separated basically.

In the example shown in FIG. 10, if the user specifies his or her preferential genre, he or she is allowed to specify more detail subjects in the intermediate level classes. There may be such a case that the intermediate level class contains major classes in itself. In this example, what is shown is an example of intermediate level classes in case that the user selects "Music Program" as his or her preferential genre. The actual menu on this screen is generated automatically in the receive-side system by using the pre-determined service menu and the registered chargeable service menu.

In this example, the switches for the major level classes (genre of the output information) contains "Map Information", "Car Navigation Function", "News Programs", "Sports Programs", "Music Programs", "Movie and Drama", "Television Station Broadcasting Program", "Radio Station Broadcasting Program", "Popular Songs in Japan", "Japanese Music", "Western Popular Music", "Western Music" and "Next". A basic structure in one example of this receive-side information processing system" is shown in FIG. 11 in case of applying this technology to the broadcasting receiver.

Figure 11:
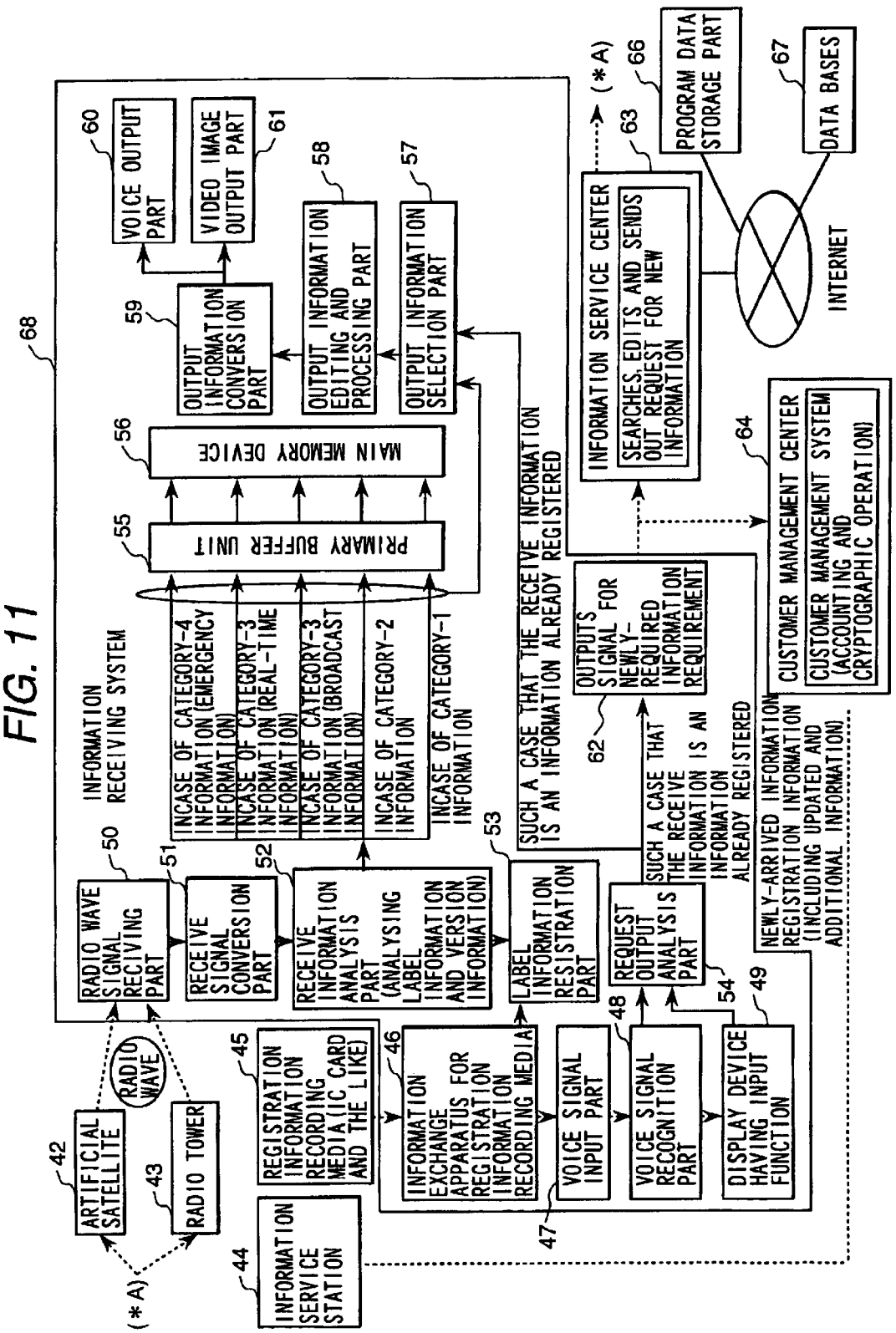
FIG. 11 is a schematic diagram of the example system of the present invention.

FIG. 11 shows a schematic structure of this new type of broadcasting receiver, in which the information obtained through the information transmission apparatus (without distinction of wireless or wired) is stored into the main memory unit through the primary buffer. The procedures for this operation are as shown in Table 2 and others.

In this example, the radio wave from the artificial satellite or the radio tower enters the radio wave signal receive part 50 in the information receive system 68. The following procedures are executed in the information receive system 68 unless otherwise specified. After the radio wave received at the radio wave signal receive part 50 is converted at the receive signal conversion part 51, its label information and version information are analyzed at the receive information analysis part 52.

The information to be served is extracted from the information service station 44 by the registration information recording media 45, and its information signal reaches the receive information analysis part 52 through the information exchange apparatus for the registration information recording media and the label information registration part 53. The information service station 44 and the registration information recording media 45 are located outside the information receive system 68.

The signals arriving at the receive information analysis part 52 through a couple of routes is transferred to the primary buffer apparatus 55 and carried through the main memory unit 56 to the output information selection part 57.

The input signal from the voice signal input part 47 in the information receiving system 68 is sent to the requirement output analysis part 54 through the voice signal recognition part 48. A signal from the display device 49 having an input function is also supplied to the requirement output analysis part 54. The output from the requirement output analysis part 54 is input to the output information selection part 57 in case that the receive signal is an information already stored, and otherwise, is input to the newly-required information requirement signal output 62 if the receive signal is an information not stored yet.

The output from the output information selection part 57 is provided out to the voice output part 60 and the video output part 61 through the output information edit and processing part 58 and the output information conversion part 59.

On the other hand, the newly-required information requirement signal output 62 is supplied to the information service center 63 and the customer management center 64, both located outside the in formation receiving system 68. The information service center 63 searches, collects or sends out the new requirement information, which is sent to the program data storage part 66 and data bases 67 (both located outside the information receiving system 68) through Internet 65 and the like, or which is sent from the information service center 63 to the artificial satellite 42 and/or the radio tower 43. The customer management center 64 has a customer management system used for accounting and cryptographic operations, and sends the newly-arrived information registration information (including updated and additional information) to the information service station 44.

The user of this broadcasting receiver inputs his or her favorite television and/or radio program titles to this broadcasting receiver through a human machine interface device such as display-based device or voice-based input device. In case that an information corresponding to his or her favorite program is already stored in the broadcasting receiver, the information is output based on its corresponding data.

For example, if the user speaks out "Main Broadcast Channel" and "News" to the voice input device, an information related to "News" among plural set of information sent in time sharing mode on the "Main Broadcast Channel" is selected and thus output in voice format.

In case that there is not any information currently required for the user (not necessarily limited to the broadcasting information) captured in the receive-side information processing system, his or her request-to-send information is sent to the information service center via wireless line such as car phone or mobile telephone line or satellite communication line, and an information is sent back through the same information transmission line (wireless line).

In case that the information requested by the user is a chargeable information, the information (label information) related to the request information as well as the information requester identification information are sent to the customer management center, where the accounting operation and other necessary operations are performed after completing the security check operation, and then, the customer management center sends back a information reporting to the information service station that the receive information is registered as a newly registered information, and in the end of this transaction, the latest chargeable information stored in the information service station is sent to the receive-side information processing system.

In case that the receive-side information processing system is loaded on the mobile station, this transmit and receive part is basically configured to be based on a wireless system, but in case that the receive-side information processing system is provided as a portable receive-side information processing system such as personal digital assistance (PDA), it is allowed that an interface device may be installed at the information service station and such a transmission and receive method may be used as the hardware connection is established by means that the PDA is coupled to this interface device or as the optical connection is established.

As described above, the information categorized into Category-2 and Category-1 is sent in a broadcast mode by using an unoccupied time slot for the transmission of Category-3 ad Category-4 information, and the receive-side information processing system captures its corresponding already registered information, and edits and stores them, in which it is practical that an independent channel dedicated for data transmission is provided and utilized effectively as the volume of this information is generally large and its information contents is supposed to be diversified.

In case that the above described operations for rewriting or writing are not finished completely for some reason, or that the above described operations for rewriting or writing can not be performed, this status is recorded in the operation recording part of the receive-side information processing system and its status message output is provided.

(An Example of Information Service Station System)

Figure 12:
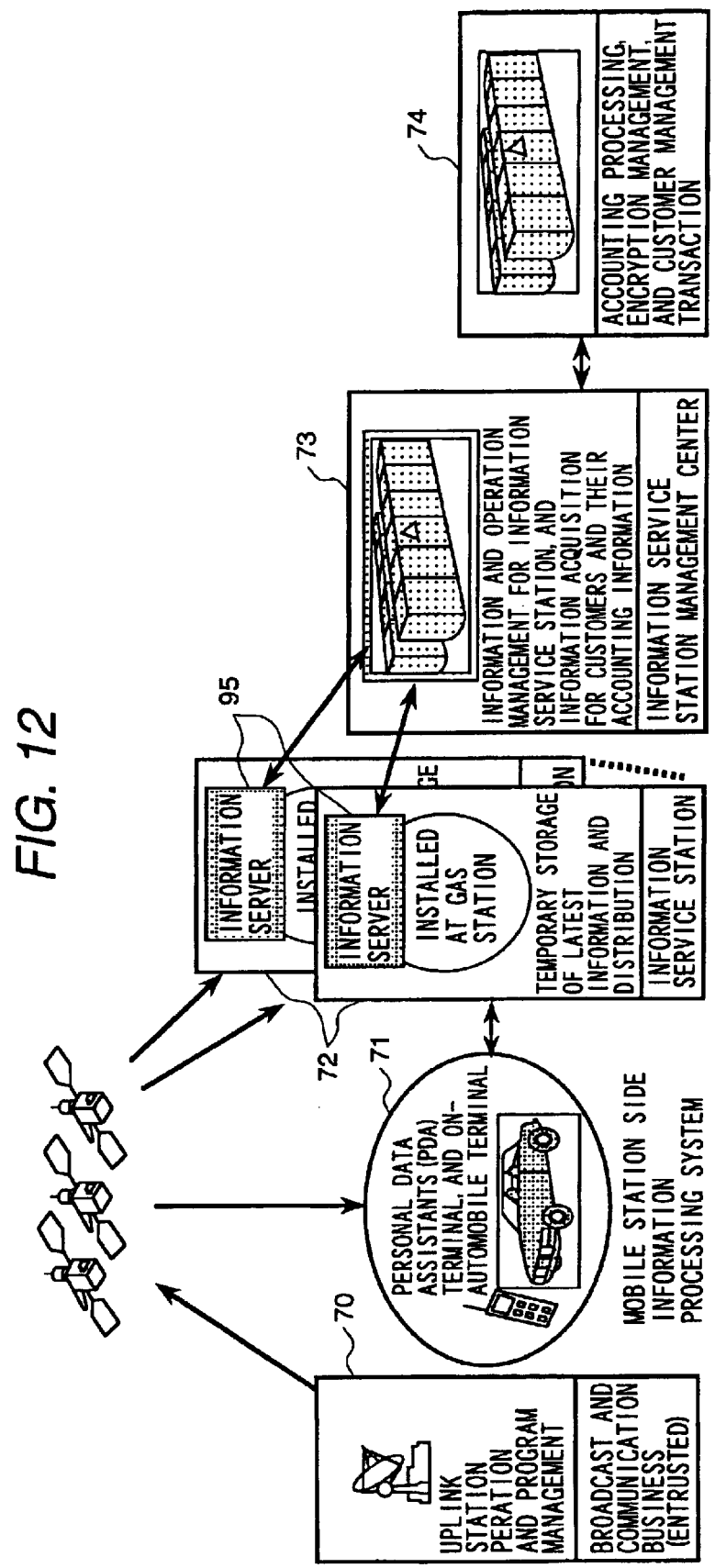
FIG. 12 is a schematic diagram of the example system of the present invention.

FIG. 12 shows an overall outline of the information service station.

When the receive-side information processing system loaded on the mobile station can not receive the sent information for some reason (for example, the mobile station is located at the place which the radio wave can not reach (for example, in the underground parking area), or the mobile station is under maintenance work), it is required to make the receive-side information processing system able to capture the lost but necessary information with some method.

The information service station is defined as a ground-based infrastructure which is installed in order to receive the information through an transmission route independent of the information transmission via radio waves from the artificial satellite ad/or the radio tower, and is aimed for the service to the users in the automobiles and located near the places easily accessible to the automobiles, such as gas station, convenience store and automobile repair shop.

The mobile-body-side information processing system 71 is embedded in the PDA and the on-vehicle terminal, and receives the information sent from the artificial satellite 69. An information is supplied to the artificial satellite 69 by the program management system 70 at the up-link station operated by the broadcasting industry and communication industry firm (for example, an entrusted service company). The information from the artificial satellite 69 is sent to the information service station 72 as well as the mobile-station-side information processing system 71, and the mobile-station-side information processing system 71 receives the signals for broadcasting or data communications. The information service station 72 has an information server 95, and is installed at the gas stations and the like in order to store temporarily and provide the latest version of information. The information service station 95 and the mobile-body-side information processing system 71 can exchange information between each other.

The individual information servers are connected to the information service station management center 73 via wired or wireless communication links, and the management center 73 operates the information and status management for the information service station 72, and the data acquisition of accounting information for the individual users. The management center 73 is also connected via wired or wireless communication links to the customer information management service provide 74.

Figure 13:
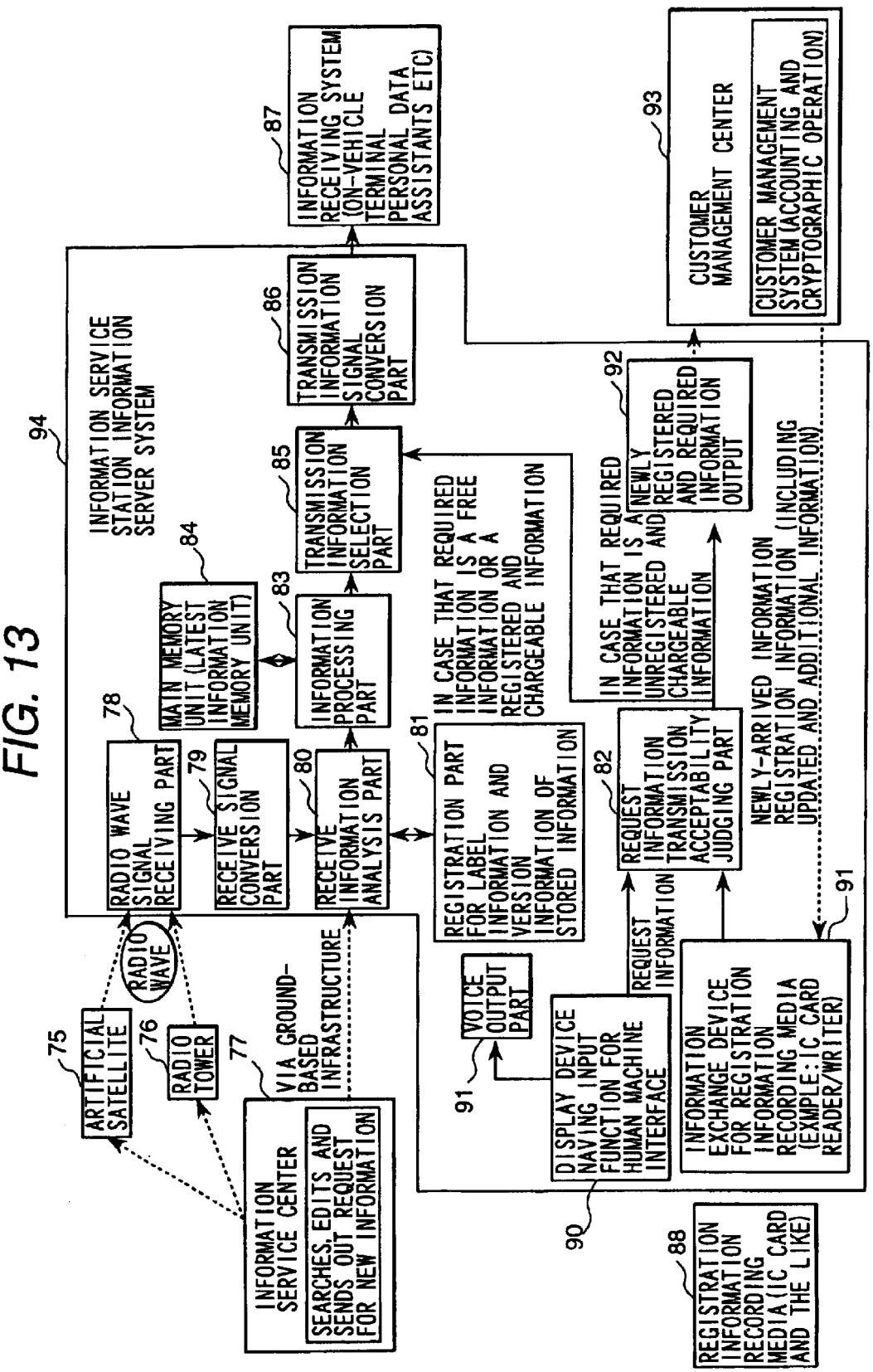
FIG. 13 is a schematic diagram of the example system of the present invention.

An example of the basic configuration of the information service station is shown in FIG. 13. This configuration is for an information processing system comprising (1) an receiving system for receiving the radio wave from the artificial satellite or the radio tower, and (2) an information processing and storage device (information server) for rewriting and storing the older version of information already received and stored or for storing the newly received information, (3) an input apparatus and a rewrite apparatus for the registration information recording media such as IC card owed by the user, (4) a transmission apparatus for transmitting the necessary information to the receive-side information processing system loaded on the mobile station, (5) an information transmission apparatus for information exchange and transmission to the system for controlling over the information service station, (6) a human machine interface device (display device) for allowing the operator of the information service station to exchange information and verify his or her operation results, and (7) another apparatus (electric power supply and the like). The operation method of this system is described in detail below.

The information service center 77 searches, edits and sends out the newly request information The information service center transmits the information signal to the artificial satellite 75 and/or the radio tower 76, and the radio wave from the artificial satellite 75 and/or the radio tower 76 reaches the radio wave signal receiving part 78. The receive signal from the radio wave signal receiving part 78 reaches the receive information analysis part 80 through the receive signal conversion part 79. The information is supplied from the information service center 77 to this receive information analysis part 80 through the ground-based infrastructure.

The basic roles of the information service station can be stated as follows. For example, in considering a mobile station so provided typically as automobiles, all of the automobiles are not used fully 24 hours a day. There is such a case that there are automobiles parked in the places like underground parking areas which the radio wave can not reach.

Thus, the data related to the Category-1 or Category-2 information can not always received directly.

All the data are transmitted to and stored at the receive-side information processing system installed at the automobile (mobile station) (for example, car computer and car navigation system and such) in the following means.

The information from the artificial satellite 75 and the like is directly received by the automobile (in case that the automobile is ready to receive the data while receiving its data, the information is directly received from the satellite). The sent from the artificial satellite 75 is always received by the information server system of the information service station (installed at several places which automobiles often stop over such as gas station, automobile repair shop, automobile supply shop and convenience store), and stored temporarily at the information server. As the information stored in the information server of the information service station 94 is always updated basically to be latest versions, the necessary data are transmitted to the automobile through the information server of the information service station 94. With this operation, even if the receive-side information processing system is not operated while the information is transmitted or when the automobile parking at an underground parking area, the information can be updated to be its latest version.

The information service station 94 is installed basically at the places where the automobiles mostly often come over, and for example, when the automobile comes over those places for oil feeding, repair or inspection, the information service station 94 exchanges information between the automobile. Those places include gas stations, automobile repair shops, parking areas, convenience stores, drug stores and restaurants in suburban areas, drive-through store and fast-food restaurants.

The state that the information stored at the information server of the information service station 94 is up to date is verified periodically by the information service station management center defined independently for managing the information service station 94. The information transmission between the information service station 94 and the information service station management center is performed by the artificial satellite communication or ground-based communication infrastructure (optical fiber cables, Internet and the like).

By means of using the ground-based communication infrastructure, it will be appreciated that the latest version of information can be received when the radio wave signal receiving part of the information service station is failed, which leads to an increase in the reliability of the overall system.

In case that the latest version of information registered in the information service station management center and the latest version of information stored in the information server of the information service station is not identical to each other by any possibility, the information transmission is performed between the information service station and the information service station management center, and the information in the information server of the information service station is updated to be the latest version.

An information transmission method in the information service station 94 is described by referring some actual examples.

EXAMPLE 1

The receive-side information processing system loaded on the automobile is a one-way communication system only having a receive function is described.

The registration information recording media (for example, an IC card and the like) 88 mounted at the car navigation system is extracted, and inserted into the information exchange device (for example, an IC card reader/writer and the like) 89 for exchanging information with the registration information recording media at the information service station 94.

The information service station 94 compares the label information and version information of the information registered in this IC card with the label information and version information of the information stored at the information service station 94, and determines the information to be sent out to the receive-side information processing system loaded on the automobile, and then, after this IC card is mounted on the receive-side information processing system loaded on the original automobile, the information transmission is initiated by the user's operation of hitting the latest information transmission button.

At the receive-side information processing system loaded on the automobile, whether the label information of the transmitted data is matched with the label information of the information registered in the IC card is examined, and only if those label information are identical to each other and the version of the transmitted information is newer, the transmitted information is captured in the receive-side information processing system.

When the new version of information is captured completely, the version information registered in the IC card is updated (so as to be synchronized to the version information of the captured information).

As far as the registration information recording media (an IC card) 99 is not inserted into the receive-side information processing system, the chargeable information cannot be received and used for output operation, and thus, it will be appreciated that the illegal acquisition of the latest chargeable information by unauthorized usage of IC cards can be protected.

In case that any chargeable information not registered in the registration information recording media (an IC card) 88 exists at the information service station 94 and the drier of the automobile judges that he or she needs this information, when the registration information recording media (an IC card and the like) 88 of the receive-side information processing system is inserted into the information exchange device with the registration information recording media at the information service station 94 (for example, an IC card reader/writer and the like), the driver specifies his or her necessary updated information (request information) through the display device 90 used for human machine interface having an input function installed at the information service station 94.

This device 90 is connected to the voice output part 91. The output information from the devices 90 and 89 are supplied to the request information transmission request acceptability judging part 82. On the other hand, the output signal from the stored information, label information and version information registration part 81 connected in series to the receive information analysis part 80 is sent to the transmission request acceptability judging part 82. In case that the requested information is a chargeable information not registered yet, the output from the judging part 82 is sent to the newly registered and required information output 92, and in case that the requested information is a free information or a chargeable information already registered, the output from the judging part 82 is sent to the transmission information selection part 85. On the other hand, the signal from the receive information analysis part 80 is sent to the transmission information selection part 85 through the information processing part 83. The information processing part 83 is connected to the main memory unit 84, and the main memory unit 84 has an updated information memory device. The output to the transmission information selection part 85 is supplied through the transmission information conversion part 86 to the information receiving system 87. This information receiving system 87 is installed in the on-vehicle terminal and the PDA.

The newly registered and required information output 92 is sent to the customer management system at the customer management center 93. The customer management system performs, for example, accounting operations and cryptographic operations. The newly-arrived information registration information (including updated and additional information) is sent from the customer management center 93 to the information exchange device 89.

So far, some required information (charge transfer account information and account number) is read out and other required information (label information and version information of the newly rewritten information, expired data of available information and the maximum number of access count to the available information) is written, and its charge is checked off automatically from the account specified by the registration information recording media (an IC card and the like) or the account specified by the driver.

In case that the provided information is free, as this transition for checking off the charge does not occur, it is not required to read the charge transfer account information and the account number), (in which the provided information can be skipped for reading, however, it is not preferable to skip the charge transfer account information and the account number in view of establishing security.)

Once the label information and version information of the newly acquired information is written into the registration information recording media (an IC card and the like), the updated information specified so far is transmitted from the information service station 94 to the receive-side information processing system loaded on the automobile in accordance with the information transmission procedure as described above. Such a information selection method at the receive side is allowed in which the procedural step for inserting the registration information recording media (an IC card and the like) into the information service station 94 is skipped.

In this case, a series of information is transmitted from the information service station 94 to the car navigation system, and the receiver judges whether those information should be captured or not by investigating whether the registration information recording media (an IC card and the like) 88 registers those information in itself or not.

Though it is predicted that it takes a time to transmit the information, this procedural method is proved to be safer as the possibility for the leakage of the security information including the charge transfer account number may be negligible.

In order to reduce the information transmission time, such a transmission method may be effective in which the information required for the user is specified explicitly by the driver through a human machine interface device installed at the information service station 94, only the specified information is transmitted from the information service station 94 to the receive-side information processing system loaded on the automobile. In case that the specified information is not a chargeable information registered in the registration information recording media (an IC card and the like), this chargeable information is not captured in the receive-side information processing system.

In this method, as the exchange of the label information and version information of the information which can be received at the receive-side information system or which has been already received can be handled with the registration information recording media (an IC card and the like) 88, even if a unregistered and chargeable information is specified by the above described operation, there is no way to recognize directly the fact that its information is not captured in the receive-side information processing system.

By means that the registration information recording media (an IC card and the like) 99 is made inserted into the information exchange device (for example, an IC card reader/write and the like) 89 with the registration information recording media, and the information inside the receive-side information processing system is made displayed, the fact that the specified information is not received can be recognized, and therefore, it is possible to receive this newly arrived information after the accounting operations described above by the similar method to that in case of capturing the updated information.

EXAMPLE 2

The information receiving and processing system loaded on the automobile is a two-way communication system having a transmit and receive function is described.

In case that the information receiving and processing system loaded on the automobile is a two-way communication system having a transmit and receive function, it is preferable to form the system as that the information station captures the class and version of the information stored in the navigation system on the automobile at first, and then, this new information is transmitted only if the version of the information at the information station is newer than that of the navigation system.

In this case, as only the information to be modified is transmitted, it will be expected that the information transmission time can be reduced.

When receiving newly a chargeable information with its label information not registered into the registration information recording media (an IC card and the like), it is required to make the information travel through the accounting system, which is similar to the case of the one-way system.

EXAMPLE 3

A method for version information management is described.

Though there are several alternative rules for defining a version information, such a version information definition method as using a time stamp as key is effective. For example, a version information defined to be "19900810.1512" represents that this information is created at 15:00 on Aug. 10, 1999. By defining the version information, it is made easy for the user to search the latest version of information. In case that any file having an identical label information to the label information of the information newly transmitted and received at the information processing device of the automobile is already defined, only the file modified is exchanged. The individual information to be transmitted has its own expiration date defined explicitly.

EXAMPLE 4

As for the method for providing an information output, the revised data and real-time data are added on the base data and provided as output. Four actual examples are described below.

EXAMPLE 4-1

An example for illustrating the category classification for the information and the information transmission timing is described for the case of the road map and traffic information.

The amount of information used for car navigation increases year by year in order to provide valuable services to the automotive drivers and passengers. However, all the information for car navigation do not changes every second. However, there is no information with its contents staying unchanged. For example, the road map information is required to be modified if new roads are constructed, and some new information should be added to the road map information if important facility is newly constructed.

On the other hand, road traffic information, road accident information and fire accident information can not be predicted before hand but has high exigency. For example, even if the fire accident information of yesterday is reported to the driver, this may not be concerned basically to those presently in the automobile. The drivers and passengers wants to know such a current status information and/or a future prospective information as a fire accident occurs near the road through which the driver and passenger move to their destination, and any traffic regulation or control is applied for supporting the fire fighting activity, or heavy traffic jam occurs presently due to a traffic accident or heavy traffic jam will be expected from now on. A set of information generating presently are categorized into predefined categories in view of the characteristic (exigency and significance in the time domain) of information, and is made transmitted by category.

The categories of information in this example are defined as follows. Category-1 information (base data) is defined to be relatively fixed information such as road map information, which is distributed at such a timing as once a month and at a time slot when the information transmission line is least occupied (for example, nighttime of Sunday). The related information accompanied with the road information, for example, the location information of signals, gas stations, convenience stores, landmark buildings, restaurants and hotels is included in Category-1 information.

Category-2 information includes differential data for the base data (for example, differential data for the road map information (such as information about closed tracks in newly constructed road and closed roads due to scheduled roadwork), differential data for the related information accompanied to the road information (such as information about new construction of traffic signals and opening and closing-down of gasoline stations and convenience stores) as well as predefined information including event information, advertising information of restaurants and fair information, which are distributed periodically once a day in the night.

Category-3 information (real-time data) includes current road traffic information, road accident information and their corresponding traffic regulation information, which is distributed timely when the information occurs.

Category-4 information (emergency information) includes accident summary information for facilities related to nuclear power or facilities handling toxic gas, information for flood, soil avalanche or earth quake, and emergency evacuation information.

EXAMPLE 4-2

An example for illustrating the category classification for the information and the information transmission timing is described for the case of rental dress information at the dress and costume hire chain stores.

The characteristics of the information management in the dress and costume hire chain stores is outlined as follows. In the dress and costume hire business which rents bridal gowns and formal wears to the bride and bridegroom for the marriage ceremony, they stocks wedding gowns and formal wears in identical styles and variations at the individual chain shops located nationwide, and allows the customers to choose from many styles and try on for size them conventionally, in which there may be such a problem that vast amount of identical wedding gowns and formal wears must be prepared and stocked at the individual chain shops with uncertainty in the customers' final decision.

Thus, major branch shops stock dresses for the customers to be able to try on, and the photographs and catalogs of dresses are distributed to the minor branch shops. The photographs of dresses are arranged on a photo album to be exhibited to the customers, and the customers are allowed to select his or her favorite dresses. Minor branch shops orders the dresses selected for rent by the customers to the major branch shops and/or the main store or head office, and the individual branch shops deliver the ordered dresses for rent by the post office parcel service to the shop ordering the dresses for rent by consulting the reservation list of dresses, and finally, the customers can rent their ordered dresses later. Thus, there are vast amount of cost spent for establishing this business model including telephone charge and transportation cost as well as the maintenance of the album (for updating photos) in order to put off the old photos of disposed dresses. There may occur several troubles due to mishandling such as double booking of ordered dresses and delivery of unexpected dresses for the customers.

In order to solve this problem, the rental business operated by electronic data exchange by using Internet has started.

For example, the information of wedding dresses is sent as data to the individual branch shops in stead of delivering their actual photos, and the individual branch shops stores this information into the information server (usually a PC), and the customer may be allowed to brows this information on the PC's display. The information stored in the information server is update timely, and its updated status of dresses and their reservation status can be obtained on the PC's display. Thus, the individual data management (photo album management) at each branch shop can be reduced, which leads to improvement in job performance and customer service quality.

Recent advances in multimedia technologies and CG (Computer Graphics) technologies makes it possible to reproduce a virtual image of the customer in his or her favorite dress actually selected by the customer with image composition technologies, and thus, the service in the shop including that the actual wedding dresses are delivered to and stocked in the branch shop for trying on them can be even eliminated ultimately.

However, as the information enabling this kind of information service requires 2D data as well as 3D data in vast volume, the amount of information required to be transmitted becomes extremely large. In order to reproduce an image of the customer in his or her favorite dress for try-on viewed in an arbitrary angle above and below the customer, or left and right to the customer, and with a sidelong angle to the customer, the position information of the major part of the dress is required. The communication cost for exchanging large amount of information on the basis of individual information server of each branch shop becomes extremely high.

In this example, the categories to be used are defined as follows. Category-1 information is the information (base information) for all the dresses for rent, Category-1 information is a modification information representing the difference from the base information for all the dresses for rent, and Category-3 information is the reservation information for the dresses for rent. By transmitting those set of information transmitted in a broadcast mode, the communication cost can be reduced to a large extent.

For example, Category-1 information is distributed when the total stock of the dresses for rent in the dresses-for-rent chain shops changes largely (for example, once a year, once a quarter, or four times a year in the vernalization phase), or when a new shop opens and its new information server is installed; and Category-2 information is distributed as the update information of the dresses for rent generated at relatively frequent intervals (for example, once a month).

The reservation information at the point when the order transaction for the dress for rent by the customer is completed can be distributed as Category-3 information.

Thus, the cost for information transmission can be reduced to a large extent as well as an integrated management of the latest information including the data for newly arrived dresses for rent and retired dresses for rent can be established, which can reduce the troubles in double booking of an identical dress for rent.

In this case, the information management is schemed as follows. As the above described information contents covers the information exclusively used by the dresses-for-rent chain shops, any third person is never allowed to be accessible to the information. The data indicating the exclusiveness of the information for the dresses-for-ret chain shops is contained in the label information of this information, and is required to be encrypted so as not to be disclosed to the third person, which can be embedded by using the registration information recording media (an IC card and the like) in order to guarantee higher security.

In case that the strategic business plan of the dresses-for-rent chain shops declares the open pricing policy (free-of-charge service) for the information the dresses for rent, this security aspect of transaction is not required and the information can be provided free of charge.

In case that the dresses-for-rent chain shop introduces a membership system, such a service menu as the information service is limited to the member with free of charge can be established by distributing the registration information recording media (an IC card and the like) or the password to the individual member.

EXAMPLE 4-3

An example for illustrating the category classification for the information and the information transmission timing is described for the case of software program information.

In view of consumer game market business, it is required to install the information meeting the user needs into software and information vending terminals represented by game software vending terminals located nationwide. Therefore, it is required to send the latest version of popular software ad the latest version of game software titles to the game software vending terminals timely in order to maintain the updated state of information.

In order to manage the information (software and data, and the like) of the software and information vending terminal in an integrated and centralized manner, the encrypted information is transmitted in a broadcast mode from oblong satellites, and the individual information server receives, decodes and revises up this information simultaneously. It is allowed to transmit the base data at first, and then send the differential data of the base data after that.

In this example, Category-1 information is sent periodically or sent at the time when a new terminal is installed in order to synchronize the information at the individual terminal with the information at the information distribution source site. Category-2 information is a software program added to the information already distributed and categorized into Category-1. Software (including game software titles) going on sale is distributed as the information categorized into Category-2 at a time slot when the transmission line is not occupied so much just before the date of going on sale. Category-3 information includes programs and data of the version-up part of the software program described above already distributed and already stored in the individual terminal as the information categorized into Category-1 or Category-2, which are distributed timely when any modification on it occurs.

The states of all the terminal can be synchronized with one another by distributing the whole base data at the time when a new terminal is installed.

EXAMPLE 4-4

An example of information transmission to the data information (including music data, images (video) data and the like) vending terminal is described.

The information covering from the basic music titles (or game software and the like) to the latest music titles now on sale is required to be installed into the music CD data vending terminals and the game software vending terminals installed at the convenience stores.

The information in large number of terminals can be updated by using the data transmission method in a broadcast mode and an encryption method.

In this example, Category-1 information is such an information as distributed periodically or at the time when a new terminal is installed in order to synchronize completely the information in the individual terminal with the information located at the information distribution source site. Category-2 information is a data file to e added to the information already distributed and categorized into Category-1. The music software and video software titles newly released on sale are distributed as Category-2 information at a time slot when the transmission line is unoccupied just before the date of going on sale.

Category-3 information includes programs and data of the version-up part of the software program described above already distributed and already stored in the individual terminal as the information categorized into Category-1 or Category-2, which are distributed timely when any modification on it occurs.

(On the Artificial Satellite System Suitable for Implementing the Present Invention)

As for the artificial satellite system suitable for applying the present invention, semi-zenith satellite system (oblong satellite system), which can continue its 24-hour service for its service coverage areas and is hardly affected by the shape of the building constructions, is optimum, for example, as disclosed in Japanese Patent Application Laid-Open Number 11-34996 (1999).

According to the present invention, with an increase in the digital information transmission speed and the information compression technologies, by noting that there is a large difference between the information transmission tie and its corresponding information output time, it will be appreciated that an information transmission method and a information output method can be provided for utilizing effectively the limited broadcasting and communication channels.

By means of utilizing effectively the limited broadcasting and communication channels, the fluctuation I the load factor of the broadcasting and communication infrastructure can be reduced, and its utilization factor can be increased, which leads to the downsizing the communication cost.

In addition, as the information transmission with adaptive tracking to the load factor of the information transmission line, the fluctuation in the load factor can be reduced and the load factor itself can be increased, which leads to an increase in the overall utilization factor of the system, and to the reduction in the overall information communication cost ultimately.

What is claimed is:

1. An information transmission method wherein
    an information to be transmitted by using an information transmission line is categorized;
    said information is transmitted in a timing for information transmission predefined for an individual category;
    said categorization is determined by update frequency and/or exigency of an information contents; and said categorization is defined to be
        (1) information having a large volume and updated in relatively low frequency;
        (2) information updated more frequently than said information (1) is;
        (3) information related to said information (1) and (2) or additional information changing an information contents more vastly than an information contents in (1) and (2), and an information sent out for broadcasting business; and
        (4) information of importance having an extremely high exigency, and
    an categorized information is transmitted at a designated timing for each category in a broadcast mode.

2. An information transmission method of claim 1, wherein
    said information (1) is transmitted once in a designated number of days;
    said information (2) is transmitted in night at a designated day;
    said information (3) is transmitted at an appropriate timing after said information is generated; and
    said information (4) is transmitted promptly when said information is generated.

3. An information receive method wherein
    an information to be received by using an information transmission line is categorized;
    said information is received and acquired in a timing for information transmission predefined for an individual category;
    said categorization is determined by update frequency and/or exigency of an information contents; and said categorization is defined to be at least
        (1) information having a large volume and updated in relatively low frequency;
        (2) information updated more frequently than said information (1) is;
        (3) information related to said information (1) and (2) or additional information changing an information contents more vastly than an information contents in (1) and (2), and an information sent out for broadcasting business; and
        (4) information of importance having an extremely high exigency, and
    an categorized information is received and acquired at a designated timing for each category.

4. An information receive method of claim 3, where
    said information (1) is received once in a designated number of days;
    said information (2) is received in night at a designated day;
    said information (3) is received at an appropriate timing after said information is generated; and
    said information (4) is received promptly when said information is generated.

5. A receive-side information processing system for acquiring an information at a designated timing predefined for individual categories when acquiring a categorized information by using an information transmission line, wherein
    based on a label information and a version information added to an transmitted information contents, whether said information is such an information as should be acquired into said information processing system or not is judged;
    whether said information should be acquired, skipped or aborted is determined;
        an information judged to be acquired is stored sequentially into a primary buffer device installed in said information processing system; and
        in order to specify in advance an information so as to be able to be acquired in said receive-side information processing system, a registration information recording media storing said information is used.

6. A receive-side information processing system of claim 5, wherein
    said registration information recording media is an IC card.

7. A receive-side information processing system of claim 5, wherein
    an information specified by a user of said receive-side information processing system among information distributed free of charge is made registered in said registration information recording media;
    a new free distribution information to be acquired into said receive-side information processing system is defined at said registration information recording media; and
    a label information and version information of a free distribution information acquired in said receive-side information processing system is made recorded and registered on said registration information recording media.

8. A receive-side information processing system for acquiring an information at a designated timing predefined for individual categories when acquiring a categorized information by using an information transmission line, comprising
    a primary buffer device for storing temporarily a transmitted information independently on an operation state of said receive-side information processing system;
    a main memory unit for storing an information to be used as an output information from said receive-side information processing system;
    an input and output device and others;
    wherein
        an information formed by editing and processing an information stored in said primary buffer device is used as an information to be stored in said main memory unit; and
        a registration operation for a chargeable information and a registration operation for a free information are processed with an identical registration information recording media.

9. A receive-side information processing system for acquiring an information at a designated timing predefined for individual categories when acquiring a categorized information by using an information transmission line, comprising a primary buffer device for storing temporarily a transmitted information independently on an operation state of said receive-side information processing system;

a main memory unit for storing an information to be used as an output information from said receive-side information processing system;

an input and output device and others;

wherein an information formed by editing and processing an information stored in said primary buffer device is used as an information to be stored in said main memory unit; and a registration operation for a chargeable information and a registration operation for a free information are processed individually with a separated registration information recording media.

10. A receive-side information processing system for acquiring an information at a designated timing predefined for individual categories when acquiring a categorized information by using an information transmission line, comprising a primary buffer device for storing temporarily a transmitted information independently on an operation state of said receive-side information processing system;

a main memory unit for storing an information to be used as an output information from said receive-side information processing system;

an input and output device and others;

wherein an information formed by editing and processing an information stored in said primary buffer device is used as an information to be stored in said main memory unit;

a registration operation for a chargeable information to be acquired into said receive-side information processing system is processed with a registration information recording media; and a registration operation for a free information is processed with a write-enabled recording media installed in said receive-side information processing system.

11. An information transmission method wherein a transmission information from a transmission source is received at a fixed receiving station;

a label information and a version information of all information, and a service recording and an operation recording of said fixed receiving station, both stored individually in plural said fixed receiving stations are defined so as to be acquired through a wireless or wired information transmission line into an information processing system formed for managing said plural fixed receiving stations so that a mobile station having a device for receiving said transmission information may acquire said transmission information also from said fixed receiving station; and in case that information stored individually in each of said plural fixed receiving stations is not updated to a latest version, or is not complete, an information to be used for updating said information is transmitted out again from an information processing system for management in said individual fixed receiving station by using said wireless or wired information transmission system, and an information in said individual fixed receiving station is updated and revised.

12. An information acquisition method wherein a transmission information from a transmission source is received at a fixed receiving station, and a mobile station having a device for receiving said transmission information is also allowed to receive said transmission information from said fixed receiving station; and in case that an information processing device at said mobile station includes only a receiving function, an registration information recording media set in said information processing device is made extracted and inserted into an information input device and an information rewrite device for a registration information recording media of an information processing device installed at said fixed receiving station, said fixed receiving station compares an information object registered in said registration information recording media and an information object stored in an information processing device at said fixed receiving station, and determines and transmits an information to be transmitted out to said information processing device of said mobile station after said registration information recording media is set back to said original information processing device at said mobile station.

13. An information acquisition method of claim 12, wherein in case that an information not stored in said registration information recording media exists at said information processing device of said fixed receiving station, and when said information is being acquired to an information processing device at a mobile station upon request of a user at said mobile station, an accounting processing is initiated by inserting said registration information recording media into a device for reading and writing an information on a registration information recording media at a fixed station, if said information is chargeable.

14. An information acquisition method wherein in case that an information processing device at said mobile station includes only a receiving function, an registration information recording media set in said information processing device is made extracted and inserted into an information input device and an information rewrite device for a registration information recording media of an information processing device installed at said fixed receiving station, said fixed receiving station compares an information object registered in said registration information recording media and an information object stored in an information processing device at said fixed receiving station, and determines and transmits an information to be transmitted out to said information processing device of said mobile station after said registration information recording media is set back to said original information processing device at said mobile station;

said transmission source is an artificial satellite or a radio tower; and a transmission information from a transmission source is received at a fixed receiving station, and a mobile station having a device for receiving said transmission information is also allowed to receive said transmission information from said fixed receiving station.

* * * * *